(12) United States Patent
Wu et al.

(10) Patent No.: US 11,574,477 B2
(45) Date of Patent: Feb. 7, 2023

(54) HIGHLIGHT VIDEO GENERATED WITH ADAPTABLE MULTIMODAL CUSTOMIZATION

(71) Applicant: Adobe Inc., San Jose, CA (US)

(72) Inventors: Gang Wu, San Jose, CA (US); Viswanathan Swaminathan, Saratoga, CA (US); Uttaran Bhattacharya, College Park, MD (US); Stefano Petrangeli, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 114 days.

(21) Appl. No.: 17/194,755

(22) Filed: Mar. 8, 2021

(65) Prior Publication Data
US 2022/0284220 A1  Sep. 8, 2022

(51) Int. Cl.
*G06V 20/40*  (2022.01)
*G06N 3/08*  (2006.01)
(Continued)

(52) U.S. Cl.
CPC .......... *G06V 20/47* (2022.01); *G06N 3/088* (2013.01); *G06T 7/73* (2017.01); *G06V 20/49* (2022.01); *G06V 40/176* (2022.01)

(58) Field of Classification Search
CPC ...... G06V 20/47; G06V 20/49; G06V 40/176; G06N 3/088; G06T 7/73
(Continued)

(56) References Cited

U.S. PATENT DOCUMENTS 10,949,705 B2 * 3/2021 Narasimha ........... G06V 40/172

2021/0319234 A1 * 10/2021 Li ...................... H04N 7/183
2022/0147736 A1 * 5/2022 Chan ................... G06V 20/41

FOREIGN PATENT DOCUMENTS

| CN | 107562965 | * | 1/2018 | ............. G06F 17/30 |
| CN | 201711415758 | * | 7/2018 | ............. G06V 20/41 |

(Continued)

OTHER PUBLICATIONS

Bhattacharya, Uttaran et al., "STEP: Spatial Temporal Graph Convolutional Networks for Emotion Perception from Gaits", Proceedings of the AAAI Conference on Artificial Intelligence, vol. 34, No. 02 [retrieved Apr. 27, 2021]. Retrieved from the Internet <https://ojs.aaai.org/index.php/AAAI/article/view/5490/5346>., Apr. 3, 2020, 9 pages.

(Continued)

*Primary Examiner* — Jerome Grant, II
(74) *Attorney, Agent, or Firm* — FIG. 1 Patents

(57) ABSTRACT

In implementations for highlight video generated with adaptable multimodal customization, a multimodal detection system tracks activities based on poses and faces of persons depicted in video clips of video content. The system determines a pose highlight score and a face highlight score for each of the video clips that depict at least one person, the highlight scores representing a relative level of the interest in an activity depicted in a video clip. The system also determines pose-based emotion features for each of the video clips. The system can detect actions based on the activities of the persons depicted in the video clips, and detect emotions exhibited by the persons depicted in the video clips. The system can receive input selections of actions and emotions, and filter the video clips based on the selected actions and emotions. The system can then generate a highlight video of ranked and filtered video clips.

20 Claims, 14 Drawing Sheets

(51) Int. Cl.
  *G06T 7/73* (2017.01)
  *G06V 40/16* (2022.01)
(58) Field of Classification Search
  USPC .......................................................... 382/103
  See application file for complete search history.

(56) References Cited

FOREIGN PATENT DOCUMENTS

| CN | 111860283 | * | 10/2020 | ............. G06V 20/40 |
|---|---|---|---|---|
| CN | 112668364 | * | 2/2021 | ............... G06K 9/00 |
| EP | 2026248 | * | 2/2009 | ............... G06K 9/00 |
| KR | 1020160069026 | * | 6/2016 | ............. G06Q 50/10 |

OTHER PUBLICATIONS

Bhattacharya, Uttaran et al., "Take an Emotion Walk: Perceiving Emotions from Gaits Using Hierarchical Attention Pooling and Affective Mapping", arXiv Preprint, arXiv.org [retrieved Mar. 24, 2021]. Retrieved from the Internet <https://arxiv.org/pdf/1911.08708.pdf>., Nov. 20, 2019, 18 pages.

Defferrard, Michaël et al., "Convolutional Neural Networks on Graphs with Fast Localized Spectral Filtering", 30th Conference on Neural Information Processing Systems (NIPS 2016) [online] [retrieved May 4, 2021]. Retrieved from the Internet <http://papers.nips.cc/paper/6081-convolutional-neural-networks-on-graphs-with-fast-localized-spectral-filtering.pdf>., Dec. 2016, 9 pages.

Feichtenhofer, Christoph et al., "SlowFast Networks for Video Recognition", Proceedings of the IEEE/CVF International Conference on Computer Vision (ICCV) [retrieved Apr. 27, 2021]. Retrieved from the Internet <https://static.googleusercontent.com/media/research.google.com/en//ava/2019/fair_slowfast.pdf>., Nov. 2019, 4 pages.

Geitgey, Adam et al., "Face Recognition", GitHub, Inc., ageitgey [retrieved Apr. 27, 2021]. Retrieved from the Internet <https://github.com/ageitgey/face_recognition>., Apr. 13, 2017, 13 pages.

Gu, Hongxiang et al., "From Thumbnails to Summaries—A Single Deep Neural Network to Rule Them All", 2018 IEEE International Conference on Multimedia and Expo (ICME) [retrieved Apr. 14, 2021]. Retrieved from the Internet <http://web.cs.ucla.edu/~hxgu/papers/icme_gu_2018.pdf>., Jul. 2018, 6 pages.

Gunawardena, Pawara et al., "Real-time automated video highlight generation with dual-stream hierarchical growing self-organizing maps", Journal of Real-Time Image Processing (2020) [online][retrieved May 5, 2021]. Retrieved from the Internet <https://doi.org/10.1007/s11554-020-00957-0>., Mar. 18, 2020, 19 pages.

Jiao, Yifan et al., "Three-Dimensional Attention-Based Deep Ranking Model for Video Highlight Detection", IEEE Transactions on Multimedia, vol. 20, No. 10 [retrieved Apr. 7, 2021]. Retrieved from the Internet <https://doi.org/10.1109/TMM.2018.2815998>., Mar. 15, 2018, 13 pages.

Jiao, Yifan et al., "Video Highlight Detection via Region-Based Deep Ranking Model", International Journal of Pattern Recognition and Artificial Intelligence, vol. 33, No. 07 [online][retrieved May 5, 2021]. Retrieved from the Internet <https://doi.org/10.1142/S0218001419400019>., Dec. 13, 2018, 14 pages.

Joho, Hideo et al., "Looking at the Viewer: Analysing Facial Activities to Detect Personal Highlights of Multimedia Contents", Multimedia Tools and Applications, vol. 51, No. 2 [retrieved Apr. 7, 2021], Retrieved from the Internet <http://citeseerx.ist.psu.edu/viewdoc/download?doi=10.1.1.699.2477&rep=rep1&type=pdf>., Oct. 28, 2010, 17 pages.

Kim, Hoseong et al., "Exploiting Web Images for Video Highlight Detection With Triplet Deep Ranking", IEEE Transactions on Multimedia, vol. 20, No. 9 [online][retrieved May 5, 2021]. Retrieved from the Internet <https://doi.org/10.1109/TMM.2018.2806224>., Feb. 14, 2018, 12 pages.

Kleinsmith, Andrea et al., "Affective Body Expression Perception and Recognition: A Survey", IEEE Transactions on Affective Computing, vol. 4, No. 1 [retrieved Mar. 17, 2021]. Retrieved from the Internet <http://web4.cs.ucl.ac.uk/uclic/people/n.berthouze/KleinsmithBerthouze12.pdf>., Jun. 2012, 20 pages.

Kocabas, Muhammed et al., "Simple Multi Person Tracker", GitHub, Inc., mkocabas [retrieved Apr. 27, 2021]. Retrieved from the Internet <https://github.com/mkocabas/multi-person-tracker>., Dec. 2019, 3 pages.

Mahasseni, Behrooz et al., "Unsupervised Video Summarization with Adversarial LSTM Networks", 2017 IEEE Conference on Computer Vision and Pattern Recognition (CVPR) [retrieved Apr. 14, 2021]. Retrieved from the Internet <https://openaccess.thecvf.com/content_cvpr_2017/papers/Mahasseni_Unsupervised_Video_Summarization_CVPR_2017_paper.pdf>., Jul. 2017, 10 pages.

Mehta, Dushyant et al., "Single-Shot Multi-Person 3D Pose Estimation From Monocular RGB", arXiv Preprint, Cornell University, arXiv.org [retrieved Apr. 27, 2021], Retrieved from the Internet <https://arxiv.org/abs/1712.03453>., Dec. 9, 2017, 16 pages.

Mesquita, Batja et al., "Emotions in Context: A Sociodynamic Model of Emotions", Emotion Review, vol. 6, No. 4 [retrieved Mar. 24, 2021], Retrieved from the Internet <http://citeseerx.ist.psu.edu/viewdoc/download?doi=10.1.1.725.8487&rep=rep1&type=pdf>., Oct. 2014, 5 pages.

Mittal, Trisha et al., "EmotiCon: Context-Aware Multimodal Emotion Recognition Using Frege's Principle", Proceedings of the IEEE/CVF Conference on Computer Vision and Pattern Recognition (CVPR), 2020 [retrieved Mar. 24, 2021]. Retrieved from the Internet, <https://openaccess.thecvf.com/content_CVPR_2020/papers/Mittal_EmotiCon_Context-Aware_Multimodal_Emotion_Recognition_Using_Freges_Principle_CVPR_2020_paper.pdf>., Jun. 2020, 10 pages.

Mittal, Trisha et al., "M3ER: Multiplicative Multimodal Emotion Recognition using Facial, Textual, and Speech Cues", Proceedings of the AAAI Conference on Artificial Intelligence, vol. 34, No. 02 [retrieved Apr. 27, 2021]. Retrieved from the Internet <https://ojs.aaai.org/index.php/AAAI/article/view/5492/5348>., Apr. 3, 2020, 9 pages.

Sun, Min et al., "Ranking Domain-Specific Highlights by Analyzing Edited Videos", Computer Vision—ECCV 2014. ECCV 2014. Lecture Notes in Computer Science, vol. 8689. Springer, Cham. [retrieved Mar. 17, 2021]. Retrieved from the Internet <https://link.springer.com/content/pdf/10.1007/978-3-319-10590-1_51.pdf>., Sep. 2014, 16 pages.

Xiong, Bo et al., "Less Is More: Learning Highlight Detection From Video Duration", 2019 IEEE/CVF Conference on Computer Vision and Pattern Recognition (CVPR) [retrieved Mar. 17, 2021]. Retrieved from the Internet, <https://openaccess.thecvf.com/content_CVPR_2019/papers/Xiong_Less_Is_More_Learning_Highlight_Detection_From_Video_Duration_CVPR_2019_paper.pdf>., Jun. 2019, 10 pages.

Yan, Sijie et al., "Spatial Temporal Graph Convolutional Networks for Skeleton-Based Action Recognition", AAAI Publications, Thirty-Second AAAI Conference on Artificial Intelligence [retrieved Mar. 24, 2021], Retrieved from the Internet <https://aaai.org/ocs/index.php/AAAI/AAAI18/paper/view/17135/16343>., Apr. 27, 2018, 9 pages.

Yao, Ting et al., "Highlight Detection with Pairwise Deep Ranking for First-Person Video Summarization", 2016 IEEE Conference on Computer Vision and Pattern Recognition (CVPR) [retrieved Apr. 7, 2021], Retrieved from the Internet <https://www.microsoft.com/en-us/research/wp-content/uploads/2016/06/2219-1.pdf>., Jun. 2016, 9 pages.

\* cited by examiner

HIGHLIGHT VIDEO GENERATED WITH ADAPTABLE MULTIMODAL CUSTOMIZATION

BACKGROUND

Many people have mobile devices, such as cellular phones, tablet devices, and other types of consumer electronics, many of which have an integrated digital camera to capture digital images and videos. People often capture videos that have a family or personal basis, such as videos of sporting events, activities, family outings, vacations, and the like, with the intention of sharing the videos with other family members and friends. People enjoy sharing personal videos that generally capture human-centric activities as the most representative aspect of the video content. Many people upload and share their videos on any number of various social media platforms, and personal videos is one of the most popular categories of online videos that people share and watch. Notably, the sheer volume of shared personal videos continues to rapidly increase on social media platforms.

Given the ever-expanding volume of video content available for viewing, people also filter and prioritize the video content that may be of interest to them, and the video content with the least amount of irrelevant and/or non-important content. Accordingly, the people who capture videos with the intention of sharing them generally want to highlight the more interesting parts of a video, and filter out the irrelevant content, thus providing video content that is more likely to be viewed, and viewed more efficiently. However, determining and editing down to the engaging highlights of a captured video can be both a tedious and time-consuming task, particularly for those who can readily capture video with any number of mobile devices, yet may not know how to then edit the video before sharing it with others or online via social media.

SUMMARY

This Summary introduces features and concepts of a highlight video generated with adaptable multimodal customization, which is further described below in the Detailed Description and shown in the Figures. This Summary should not be considered to describe essential features of the claimed subject matter, nor used to determine or limit the scope of the claimed subject matter.

Aspects of a highlight video generated with adaptable multimodal customization are described. A computing device implements a multimodal detection system, which includes various components, such as models, systems, algorithms, and/or networks, which are configured together to determine human-centric modalities, and generate a highlight video of the more interesting and relevant portions of a captured video. In an implementation, the multimodal detection system includes a video segmenter to receive and segment video content into a sequence of video clips, such as a designated duration of seconds per clip.

The multimodal detection system also includes an activity tracking model designed to track human activities with respect to different human-centric modalities, such as the poses and faces of persons depicted throughout the video clips of the video content. An autoencoder system then determines a pose highlight score and a face highlight score for each of the video clips that depict at least one person. A pose highlight score of a video clip represents a relative level of interest in an activity based on the tracked poses of the persons depicted in the video clip. Similarly, the face highlight score of the video clip represents a relative level of the interest in the activity based on the tracked faces of the persons depicted in the video clip. Generally, a pose highlight score and a face highlight score of a video clip represents how interesting a particular action is, as related to the tracked human activities depicted in the video clip with respect to different human-centric modalities.

The multimodal detection system also includes a class detection model implemented to detect actions depicted in the video clips based on the activities of the persons depicted in a respective video clip. An adaptive filtering system of the multimodal detection system can receive an input selection of one or more of the actions detected in the video clips, and then filter the video clips based on the selected actions according to a ranking of the activities depicted in the respective video clips. The video clips of the video content can be ranked for higher levels of activity to lower levels of activity depicted in the respective video clips based on the face highlight scores and the pose highlight scores of each of the video clips. The multimodal detection system can then generate a highlight video of the ranked and filtered video clips, as determined from the original video content.

Further aspects of a highlight video generated with adaptable multimodal customization are described. A computing device implements the multimodal detection system to perform operations, including to segment video content into video clips, and track the activities of persons depicted throughout one or more of the video clips of the video content. The activities are tracked with respect to human-centric modalities, such as poses and faces of the persons depicted throughout the video clips. The multimodal detection system determines the pose highlight score for each of the video clips that depict at least one person, where the pose highlight score of a video clip represents a relative level of interest in an activity based on the poses of the persons depicted in the video clip. Similarly, the multimodal detection system determines the face highlight score for each of the video clips that depict at least one person, where the face highlight score of a video clip represents a relative level of the interest in the activity based on the faces of the persons depicted in the video clip. Additionally, the multimodal detection system determines pose-based emotion features for each of the video clips that depict at least one person. The pose-based emotion features are determined by a network of the multimodal detection system, where graph convolution network layers of the network are trained unsupervised without human annotations to facilitate the determinations of the pose-based emotion features. A pose-based emotion feature indicates an emotion determined based on the poses of the persons depicted in a video clip.

The multimodal detection system detects actions depicted in the video clips, such as based on the activities of the persons depicted in a video clip. The multimodal detection system also detects emotions exhibited by the persons depicted in the video clips, where the emotions detected in a video clip are based on the pose-based emotion features corresponding to the video clip. The multimodal detection system can receive an input selection of one or more of the actions detected in the video clips of the video content. Additionally, the multimodal detection system can receive another input selection of one or more of the emotions exhibited by the persons depicted in the video clips of the video content. The multimodal detection system filters the video clips according to a ranking of the video clips for higher levels of activity to lower levels of activity depicted in the respective video clips, and also filters for the video clips that include the selected emotions. The multimodal detection system then generates the highlight video from the ranked and filtered video clips that depict the selected actions and include the selected emotions, as determined from the original video content.

BRIEF DESCRIPTION OF THE DRAWINGS

Implementations of a highlight video generated with adaptable multimodal customization are described with reference to the following Figures. The same numbers may be used throughout to reference similar features and components that are shown in the Figures.

DETAILED DESCRIPTION

Figure 1:
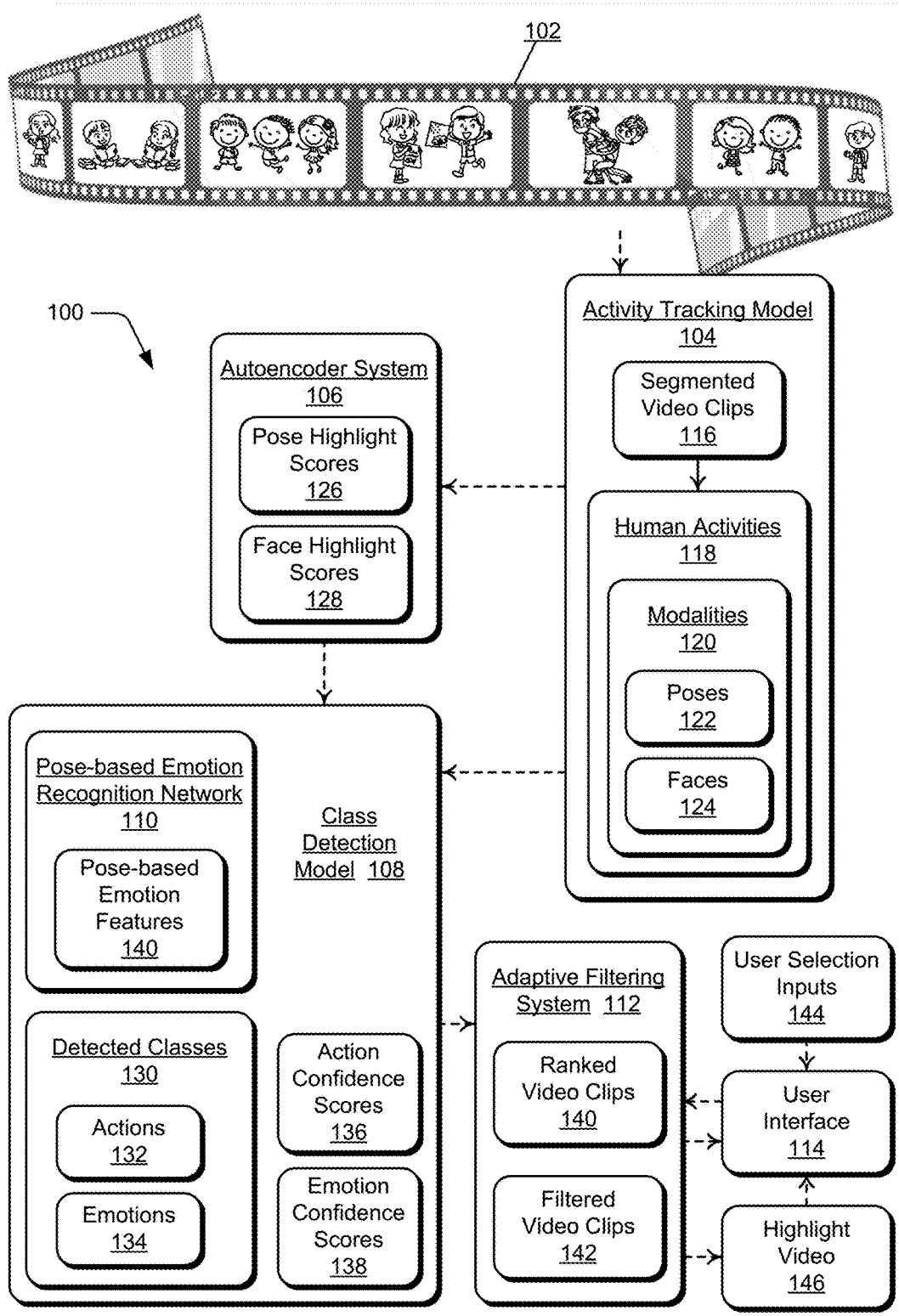
FIG. 1 illustrates an example of a multimodal detection system that can implement aspects of the techniques for a highlight video generated with adaptable multimodal customization.

Implementations of a highlight video generated with adaptable multimodal customization are described, and provide techniques to generate a highlight video of the more interesting and relevant portions of a captured video. Given the subjective nature of what may be more "interesting" or "relevant" to one person or another, the described techniques provide a viewer with customizable class selection and threshold inputs to a multimodal detection system that ranks and filters the video clips of a captured video for the viewer, notably based on viewer preferences as to what constitutes interesting or relevant highlights of the video. Generally, in personal videos that generally depict human-centric activities as the most representative aspect of the video content, it is the people in the videos that constitute the most highlightable parts of a captured video. However, conventional techniques and current methods for generating highlight clips from video do not explicitly consider the people captured in a video as the centric content depicted in the video, and typically can only determine video highlights that may not capture the human-centric activities that are of interest to the viewer. The current methods are general purpose and may only provide sub-optimal results for personal video highlights, leading to a poor user experience. The notion of what is interesting or relevant, as well as highlightable, dynamically changes based on both the video content and the subjectiveness of the viewer, and conventional techniques and current methods do not provide adaptability for changing viewer requirements.

Generally, a multimodal detection system can be implemented as an artificial intelligence (AI) service with a combination of various components, models, systems, and/or networks configured together to generate a highlight video from video clips that represent the highlights of captured video content. Given an input of video content, the multimodal detection system generates a set of highlight video clips that capture the most interesting content based on activity in the overall captured video, with an aspect of subjective user interaction. Notably, the multimodal detection system implemented as an artificial intelligence service described herein does not require human annotations for training, unlike the tedious aspect of conventional techniques.

As an aspect of implementation, the more "interesting" or "relevant" portions of captured video content are those sections (e.g., the video clips) with a higher intensity of human activity. The multimodal detection system tracks the human activities relative to the human-centric modalities of the poses and faces of the people depicted throughout the video clips of the video content, and the larger the scatter of the pose and face landmarks of a person in the video clips, the person is determined to have a higher intensity of activity. If a video clip depicts activity in terms of actions and emotions expressed by persons in the video, then the video clip is allocated a higher highlight score in the form of a pose highlight score and a face highlight score.

The video clips of the video content can then be ranked and further refined by filtering the video clips based on the actions and expressed emotions by the people depicted in the video content. A user interface of the multimodal detection system displays portions of the video content that depicts people performing activities, as well as a distribution of the detected activities based on determined highlight scores for each video clip of the video content. A user can select from the most relevant actions and emotions occurring the most often in the video content, and the multimodal detection system can then filter the video clips of the video content based on the user class selections and threshold inputs. The user can select or unselect actions and/or emotions based on the user's subjective viewing preferences and requirements, and the distribution of the highlight scores changes to reflect the distribution for the selected actions and/or emotions. The multimodal detection system can then generate a highlight video from the filtered video clips of the video content, and notably, the highlight video is representative of relevant content to both the original captured video and to the subjective viewing preferences of the user.

In other implementations of the multimodal detection system, the human activities depicted in the video clips of the video content can be tracked relative to other human-centric modalities. The framework of the system is designed to incorporate any other types of human-centric modalities, and for each new human-centric modality, a corresponding activity tracking model can be implemented with similar techniques applied to track the human activities in the video content with respect to the human-centric modalities. Further, although aspects of the techniques for a highlight video generated with adaptable multimodal customization are described in the context of video content that depicts people, and basing determinations of video highlights on the activities of the people depicted in the video content, the described concepts are applicable to other detectable subjects in captured video. The aspects of pose and face extraction can be utilized based on skeletal representations to track the movement and activities of other subjects, such as animals.

In aspects of a highlight video generated with adaptable multimodal customization, as described herein, the multimodal detection system includes various components, such as models, systems, algorithms, and/or networks, which are configured together to determine human-centric modalities, and generate a highlight video of the more interesting and relevant portions of a captured video. The multimodal detection system and/or any of the components can be implemented using machine learning and/or training and using neural networks. Any of the components of the multimodal detection system can be implemented as any type of machine learning or neural network with trained classifiers, such as in software and/or in hardware in any type of computing device.

The machine learning can be implemented as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

The multimodal detection system includes a video segmenter to receive and segment video content into a sequence of video clips, such as a designated duration of seconds per clip. The multimodal detection system also includes an activity tracking model to track human activities with respect to different human-centric modalities, such as the poses and faces of persons depicted throughout one or more of the video clips of the video content. An autoencoder system then determines a pose highlight score and a face highlight score for each of the video clips that depict at least one person. A pose highlight score of a video clip represents a relative level of interest in an activity based on the tracked poses of the persons depicted in the video clip. Similarly, the face highlight score of the video clip represents a relative level of the interest in the activity based on the tracked faces of the persons depicted in the video clip. Generally, a pose highlight score and a face highlight score of a video clip represents how interesting a particular action is, as related to the tracked human activities depicted in the video clip with respect to different human-centric modalities.

The multimodal detection system includes a class detection model implemented to detect actions depicted in the video clips based on the activities of the persons depicted in a respective video clip. The class detection model of the multimodal detection system also includes a pose-based emotion recognition network to determine pose-based emotion features for each of the video clips that depict at least one person. The pose-based emotion features include detected face emotions and detected pose emotions, and a pose-based emotion feature indicates an emotion determined based on the poses of the persons depicted in the video clips of the video content. The class detection model detects the emotions expressed or exhibited by the persons depicted in the video clips, where the emotions detected in a video clip are based on the pose-based emotion features, including both the pose-based and the face-based emotion features corresponding to the video clip.

An adaptive filtering system of the multimodal detection system can receive an input selection of one or more of the actions detected in the video clips, and then filter the video clips based on the one or more selected actions according to a ranking of the activities depicted in the respective video clips. The video clips of the video content can be ranked for higher levels of activity to lower levels of activity depicted in the respective video clips based on the face highlight scores and the pose highlight scores of each of the video clips. Additionally, the multimodal detection system can receive another input selection of one or more of the emotions expressed or exhibited by the persons depicted in the video clips of the video content. The multimodal detection system can then generate a highlight video of the ranked and filtered video clips that depict the selected actions and include the selected emotions, as determined from the original video content.

While features and concepts of a highlight video generated with adaptable multimodal customization can be implemented in any number of different devices, systems, networks, environments, and/or configurations, implementations of a highlight video generated with adaptable multimodal customization are described in the context of the following example devices, systems, and methods.

FIG. 1 illustrates an example of a multimodal detection system 100 in which aspects of the techniques for a highlight video generated with adaptable multimodal customization can be implemented, as described herein. In this example, the multimodal detection system 100 is implemented with various components, such as models, systems, algorithms, and/or networks, which are configured together to determine human-centric modalities, and generate a highlight video of the more interesting and relevant portions of a captured video that is input as video content 102 into the multimodal detection system. As described herein, the video content 102 is digital video content with frames of digital images, and the depiction of the video content shown in FIG. 1 is merely illustrative of digital video, which in this example is video content that depicts people engaged in activities.

One or more computing devices implement the components of the multimodal detection system 100, such as any type of consumer electronic device, computing device, client device, mobile device, mobile phone, tablet device, communication, entertainment, gaming, media playback, and/or other type of electronic and/or computing device. In this example, the multimodal detection system 100 can be implemented by a computing device that includes any number and combination of different components as further described with reference to the example device shown in FIG. 14.

The multimodal detection system 100 integrates components that include an activity tracking model 104, an autoencoder system 106, a class detection model 108 with a pose-based emotion recognition network 110, and an adaptive filtering system 112. The multimodal detection system 100 also generates a user interface 114, such as for display on a display device of a computing device that implements the components of the multimodal detection system. Generally, the multimodal detection system 100 can be implemented in two stages or phases. In an implementation, the first stage of the multimodal detection system 100 includes the activity tracking model 104 and the autoencoder system 106.

Overall, the first stage can be trained as an unsupervised network to leverage pose-based and face-based human actions and emotions per video clip in large-scale unlabeled datasets to learn highlight scores for all of the video clips. The second stage of the multimodal detection system 100 includes the class detection model 108, the pose-based emotion recognition network 110, and the adaptive filtering system 112. The second stage of the display screen 100 utilizes pre-trained action and emotion recognition networks to detect different action and emotion classes in the video clips of the video content, as well as determine a confidence of the detections so that a set of highlight video clips generated as a highlight video can be dynamically changed and updated based on user input and selected viewing preferences.

The components (e.g., the models, networks, algorithms, and systems) of the multimodal detection system 100, as well as any of the sub-systems and components, can each be implemented as one or more modules that include independent processing, memory, and/or logic components functioning as a computing and/or electronic device integrated with the computing device that implements the multimodal detection system. Alternatively or in addition, the components (e.g., the models, networks, algorithms, and systems) of the multimodal detection system 100 can be implemented in software, in hardware, or as a combination of software and hardware components. In this example, the components of the multimodal detection system 100 are implemented as software applications, components, or modules, such as executable software instructions (e.g., computer-executable instructions) that are executable with a processing system (e.g., a processor, graphics processor, and the like) of the computing device to implement aspects of the described techniques for a highlight video generated with adaptable multimodal customization.

As software applications, modules, algorithms, or components, the models, networks, and systems of the multimodal detection system 100 can be stored in memory of the computing device (e.g., in the device memory), or in any other suitable memory device or electronic data storage implemented with the multimodal detection system. Alternatively or in addition, the models, networks, algorithms, and systems of the multimodal detection system 100 may be implemented in firmware and/or at least partially in computer hardware of the computing device. For example, at least part of models, networks, algorithms, and systems of the multimodal detection system 100 may be executable by a computer processor, and/or at least part of models, networks, algorithms, and systems of the multimodal detection system 100 may be implemented in logic circuitry.

The activity tracking model 104 of the multimodal detection system 100 receives the video content 102 as an input to the system. The video content 102 is an example of a personal video that generally depicts a person or people engaged in human-centric activities as the most representative aspect of the video content, such as children in this example during a family outing or on a family vacation. The video content 102 is segmented into a sequence of video clips 116, which can each be a designated duration of seconds per video clip. For example, the sequence of video clips 116 may be segmented in half-second durations, one second durations, five second durations, etc. A single video frame of the video content 102 would be the lowest denomination for a video clip as segmented from the video content. In implementations, the video content 102 can be segmented into the sequence of video clips 116 based on a designated duration, or based on a continuity of the action depicted in the video content 102, given that activities 118 (e.g., human activities) may be relatively slow or relatively fast depending on the intended subject tracking. An adaptive segmentation may be implemented to account for the temporal continuity of different videos depicting different subjects and/or different levels of the activities 118.

The activity tracking model 104 can then evaluate the segmented video clips 116 based on tracking the human activities 118 with respect to various, multiple human-centric modalities 120, such as poses 122 and faces 124 of the people depicted in the video clips of the video content. In other implementations, the segmented video clips 116 can be evaluated based on additional modalities 120, such as audio, speech, or based on any number of other detectable aspects of subjects depicted in video content. Tracking the audio in video clips may provide clues about the video highlights, such as by correlating the audio that corresponds to particular video frames and then determining some aspect of activity from the audio. Generally, the modalities 120 are the detectable aspects of subjects depicted in video content, and as shown in the figures and described herein, the aspects of the techniques for a highlight video generated with adaptable multimodal customization are described in the context of video content that depicts people as the subjects for tracking their activity throughout the segmented video clips 116 of a captured video.

Figure 2:
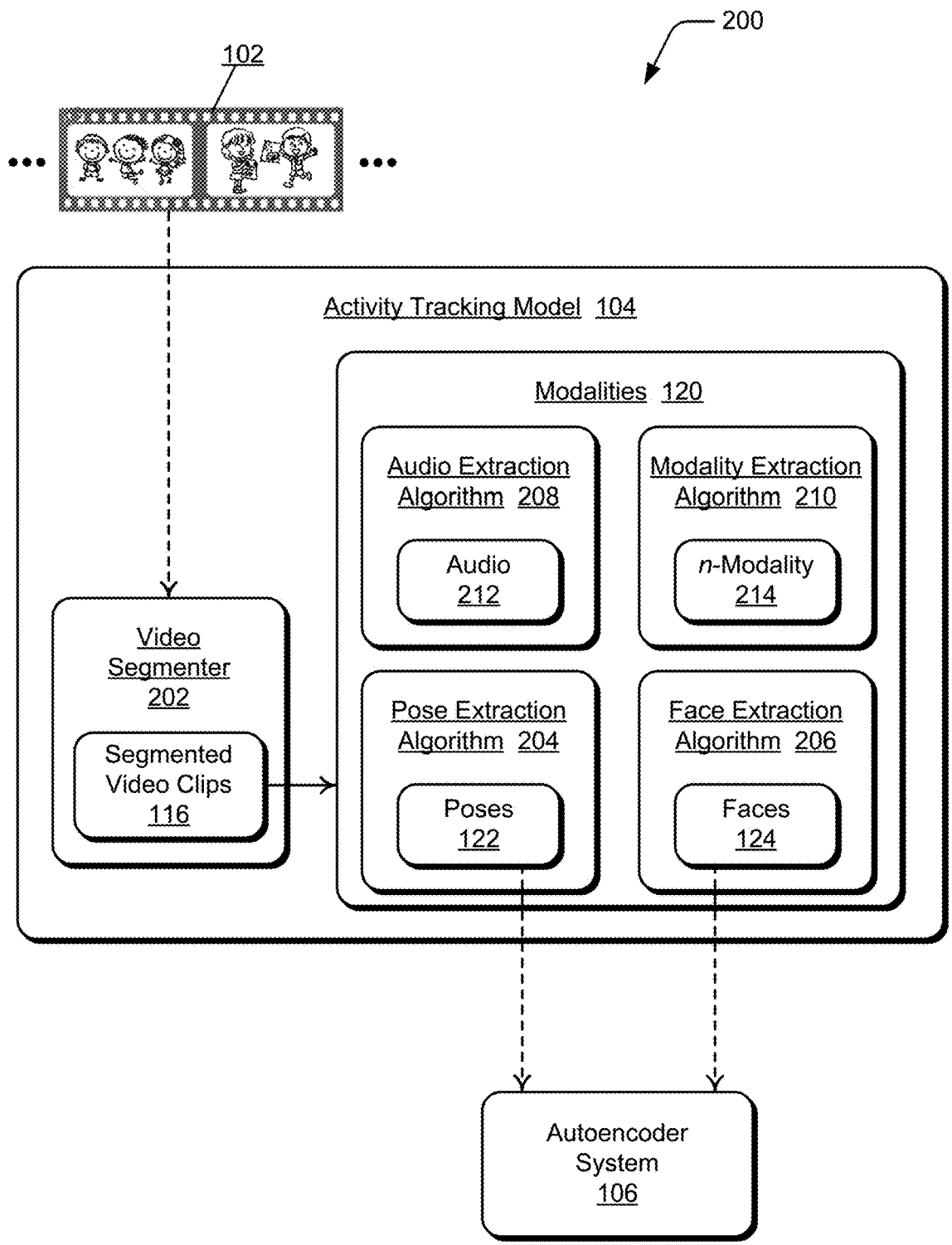
FIG. 2 further illustrates an example of features of an activity tracking model of the multimodal detection system implemented for a highlight video generated with adaptable multimodal customization, as described herein.

FIG. 2 further illustrates an example 200 of features of the activity tracking model 104 implemented in the multimodal detection system 100 to track persons depicted in the video content 102 and determine activity throughout the video clips 116 of the video content. The video clips 116 of the video content 102 that do not include or depict at least one person are discarded as having no relevance to the determination of activity depicted throughout the video content. As described above, the activity tracking model 104 receives the video content 102 and a video segmenter 202 segments the video content into the sequence of segmented video clips 116. In this example 200, the activity tracking model 104 includes a pose extraction algorithm 204 to track and determine the poses 122 of the persons depicted throughout one or more of the video clips 116 of the video content. The activity tracking model 104 also includes a face extraction algorithm 206 to track and determine the faces 124 of the persons throughout one or more of the video clips 116 of the video content.

In other implementations, the activity tracking model 104 may include an audio extraction algorithm 208 and/or any number (n−) of other types of modality extraction algorithms 210 to track and determine other respective modalities 120, such as audio 212 that relates to the persons detected throughout the video clips 116, and other types of n-modality 214. In implementations, the human activities depicted in the video clips 116 of the video content 102 can be tracked relative to other human-centric modalities 120. The framework of the multimodal detection system 100 is designed to incorporate any other types of human-centric modalities, and for each additional human-centric modality, a corresponding extraction algorithm of the activity tracking model 104 can be implemented with similar techniques applied to track the human activities in the video content with respect to the human-centric modalities.

In an implementation, the activity tracking model 104 of the multimodal detection system 100 is a multi-person tracker to track the activities 118 of the persons depicted in the video content 102 throughout the video clips 116. The activity tracking model 104 can implement the pose extraction algorithm 204 as described and detailed in the document "Single-shot Multi-Person 3d Pose Estimation from Monocular RGB" by D. Mehta et al. (2018 International Conference on 3D Vision (3DV), 2018, pp. 120-130), which is incorporated by reference herein. Additionally, the activity tracking model 104 can implement the face extraction algorithm 206 utilizing conventional facial recognition techniques. One such example is described and detailed in the document "Deep Residual Learning for Image Recognition" by K. He et al. (2016 IEEE Conference on Computer Vision and Pattern Recognition (CVPR), Las Vegas, NV, USA, 2016, pp. 770-778, doi: 10.1109/CVPR.2016.90), which is incorporated by reference herein.

The pose extraction algorithm 204 is used to define each pose in a video clip as a graph $G_{pose} = \{V_{pose}, E_{pose}\}$ where the nodes in $V_{pose}$ are body joints, and the edges in $E_{pose}$ are of three types: (1) bones connecting the joints of a detected person, (2) inter-person edges connecting the same joints of different persons in a video clip, and (3) temporal edges connecting the same joints of a person across different video clips. Similarly, the face extraction algorithm 206 is used to define a graph $G_{face} \{V_{face}, E_{face}\}$ on the facial landmarks of a person depicted in the video content, where the nodes in $V_{face}$ are the facial landmarks themselves and the edges in $E_{face}$ connect the facial landmarks. Additionally, inter-person and temporal edges are determined and added to the graph.

Returning to the discussion of FIG. 1, the autoencoder system 106 of the multimodal detection system 100 receives inputs as the poses 122 and the faces 124 of the persons depicted in the video clips 116 of the video content 102 from the activity tracking model 104. The autoencoder system 106 then determines a pose highlight score 126 for each of the video clips 116 that depict at least one person, where the pose highlight score 126 of a video clip 116 represents a relative level of interest in an activity based on the tracked poses 122 of one or more persons depicted in the video clip. The autoencoder system 106 also determines a face highlight score 128 for each of the video clips 116 that depict at least one person, where the face highlight score 128 of a video clip 116 represents a relative level of the interest in the activity based on the tracked faces 124 of the one or more persons depicted in the video clip. The pose highlight score 126 and the face highlight score 128 of a particular video clip reflect the relevance of the video clip to the human-based content in the captured video. Generally, a pose highlight score 126 and a face highlight score 128 of a video clip 116 represents how interesting a particular action is, as related to the tracked human activities 118 depicted in the video clip 116 with respect to the different human-centric modalities 120.

The highlight scores are based on the activities of the persons determined from the multiple modalities 120, including the poses 122 and the faces 124. The autoencoder system 106 is implemented as a network architecture that learns to weigh the video clips 116 of the video content 102 based on their relevance in reconstructing the human-based content in the video. As a result, the video clips 116 with more depictions of the persons and activities are weighed higher than other video clips that do not include at least one person and/or have little to no determinable activity. In an implementation, the pose highlight scores 126 and the face highlight scores 128 of the video clips 116 range from zero (0) to one (1). A pose highlight score 126 of one (1) indicates a higher level of activity depicted in a video clip 116 than a pose highlight score of zero (0). Similarly, a face highlight score 128 of one (1) indicates a higher level of activity depicted in the video clip 116 than a face highlight score of zero (0).

Figure 3:
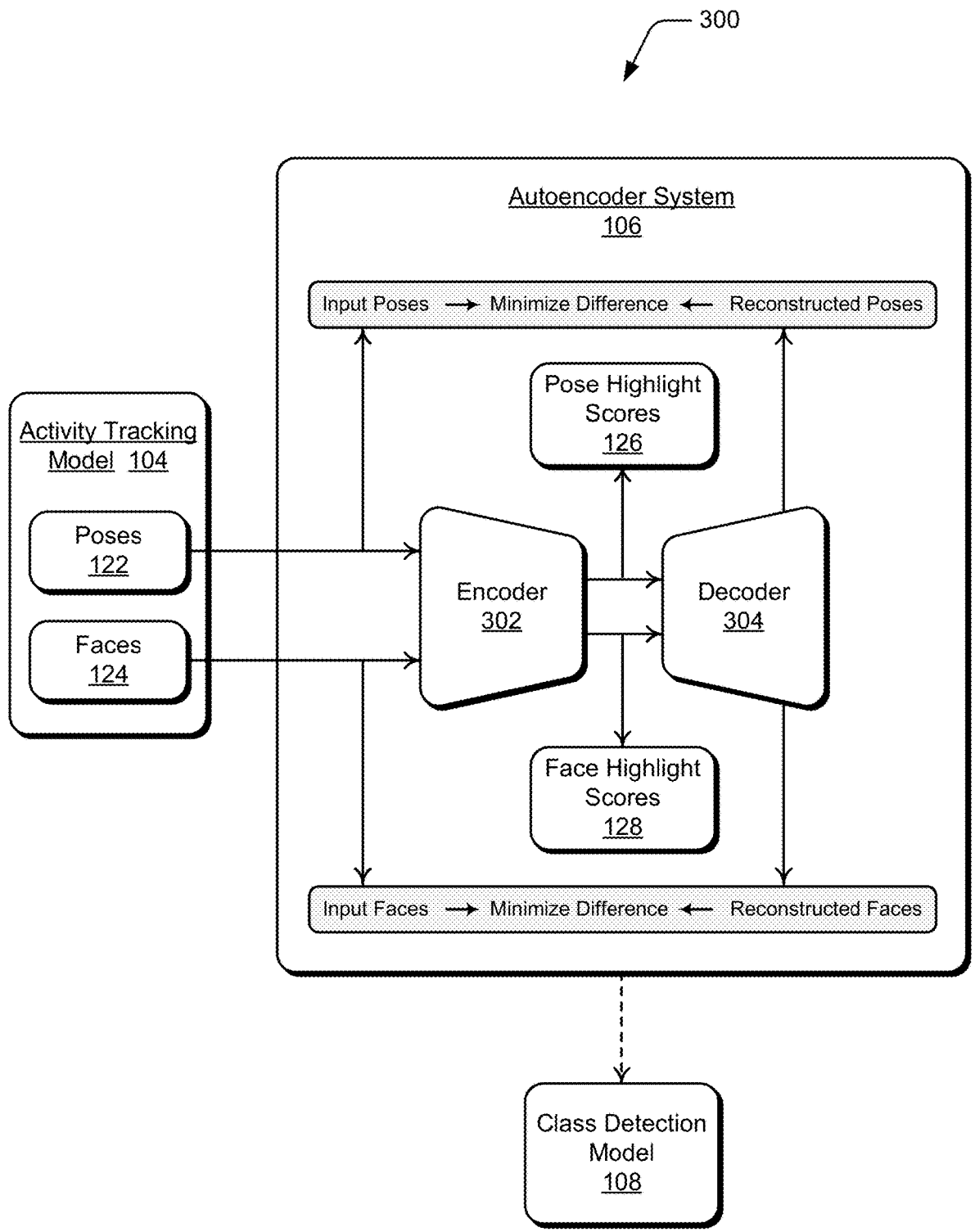
FIGS. 3 and 4 further illustrate examples of features of an autoencoder system of the multimodal detection system implemented for a highlight video generated with adaptable multimodal customization, as described herein.

FIG. 3 further illustrates an example 300 of features of the autoencoder system 106 implemented in the multimodal detection system 100 to determine the pose highlight score 126 and the face highlight score 128 for each of the video clips 116 that depict at least one person. As described above, the autoencoder system 106 receives input as the poses 122 and the faces 124 of the persons depicted in the video clips 116 of the video content 102 from the activity tracking model 104. In this example 300, the autoencoder system 106 includes an encoder 302 and a decoder 304, and the autoencoder system 106 is a representation of the network architecture further illustrated in FIG. 4.

In this example 300, the encoder 302 receives the input modalities 120 as the poses 122 and the faces 124 per each of the video clips 116, and transforms them into weights, which are the pose highlight scores 126 and the face highlight scores 128. The decoder 304 of the autoencoder system 106 weighs each video clip 116 with its pose highlight score 126 to reconstruct the poses, and with its face highlight score 128 to reconstruct the faces. Given the reconstructions of the poses and faces, autoencoder losses are then used to train the full network. Notably, the multimodal detection system described herein, such as may be implemented as an artificial intelligence service, does not require human annotations for training. For post-training of the network, the encoder 302 is implemented to predict the pose highlight scores 126 and the face highlight scores 128 for each of the video clips 116 of the video content. The net highlight score for each video clip 116 is computed using a linear combination of the pose and face highlight scores.

Figure 4:
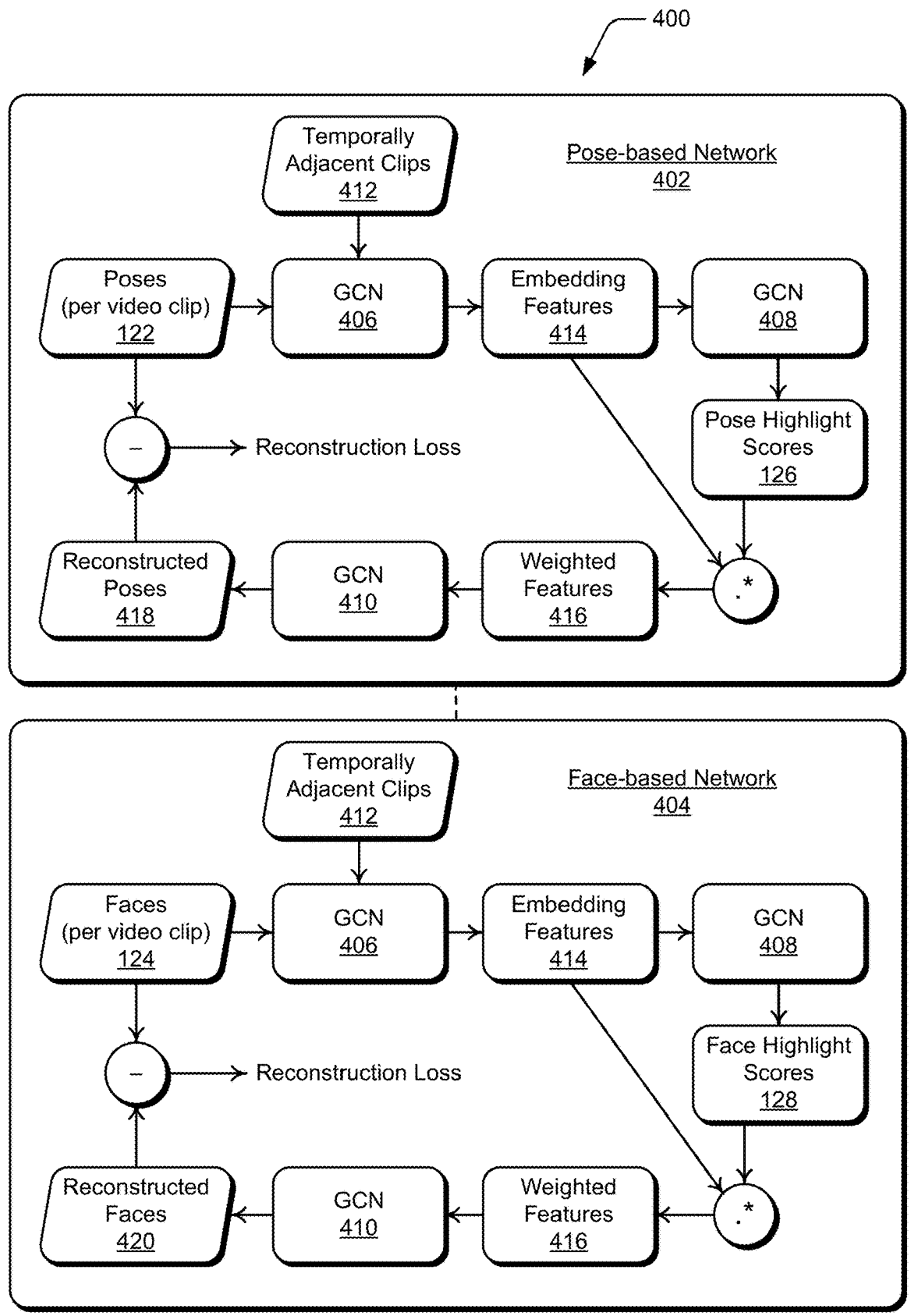

FIG. 4 further illustrates an example 400 of the network architecture of the autoencoder system 106, as shown and described above with reference to FIG. 3. The network architecture includes a pose-based network 402 and a face-based network 404. The network is trained using graph convolution network (GCN) layers of GCNs 406, 408, 410 to learn features based on the spatial-temporal activities of each person in each of the video clips 116 (e.g., based on the temporally adjacent clips 412). The GCNs 406, 408, 410 of the network architecture are efficient at learning meaningful feature representations from the local neighborhoods in graph-structured data. Notably, human activities commonly translate to sets of local changes in their poses, such as during walking or running, with arm swings affecting only the arm joints, head bobbing affecting only the head and neck joints, and so on. The graph convolutions can capture these local changes.

The GCN layers of the GCNs 406, 408, 410 in the pose-based network 402 operate using the pose adjacency matrix computed from $G_{pose}$. Similarly, the GCN layers of the GCNs in the face-based network 404 operate using the face adjacency matrix computed from $G_{face}$. The first GCN 406 in both of the pose-based network 402 and the face-based network 404 has six convolution layers, and given a video clip 116, reduces the pose and face-landmark graphs to corresponding feature representations (e.g., the embedding features 414) as: $Z_{pose} = GCN(G_{pose}, W_{pose})$ and $z_{face} = GCN(G_{face}, W_{face})$ where $W_{pose}$ and $W_{face}$ denote the total set of trainable parameters across all the six layers of each GCN. For each layer L, a definition of graph convolution can be used: $z^{(L)}=\sigma(\text{Adj}(G)z^{(L-1)}W^{(L)})$ where $z^{(L)}$ denotes the output layer L; $W^{(L)}$ denotes the set of trainable parameters in layer L; Adj( ) denotes the adjacency matrix of the given graph; and $\sigma(\cdot)$ is the activation function.

The second GCN 408 in both of the pose-based network 402 and the face-based network 404 has two convolution layers and operates similarly to produce highlight scores $h_{pose}$ and $h_{face}$ per person in the video clip 116 from the corresponding feature representations $Z_{pose}$ and $Z_{face}$ In the last GCN convolution layer, the sigmoid function is used as activation (instead of ReLU) to constrain the highlight scores between zero (0) and one (1). To obtain a single highlight score h for an entire video clip 116, the maximum pose and face highlight scores across all of the persons in the video clip are obtained, and a weighted mean of the two maximums is determined, as per the following equation:

$$h = \alpha \max_{p \in \mathcal{P}} h_{pose} + (1-\alpha) \max_{p \in \mathcal{P}} h_{face}$$

where $\mathcal{P}$ is the set of persons in the video clip, and a is defined as:

$$\alpha := \frac{\text{\# video clips where} > 50\% \text{ of pose joints are visible}}{\text{\# clips with} > 50\% \text{ pose joints visible} + \text{\# clips with} > 50\% \text{ face landmarks visible}}$$

To train the network to learn meaningful values for h, the feature representations are decoded back to the poses and face landmarks. The highlight scores $h_{pose}$ and $h_{face}$ (e.g., the pose highlight scores 126 and the face highlight scores 128) are used as weighting for the feature representations $Z_{pose}$ and $z_{face}$ (e.g., the embedding features 414), respectively. A pointwise multiplication of the highlight scores and the feature representations is performed to obtain weighted feature representations (e.g., the weighted features 416) as: $W_{pose}=h_{pose}\odot Z_{pose}$ and $W_{face}=h_{face}\odot Z_{face}$.

The third GCN 410 in both of the pose-based network 402 and the face-based network 404 has six convolution layers and operates similarly to the other GCNs to reconstruct the input poses and face landmarks from the weighted feature representations (e.g., the weighted features 416). The pose and face landmarks of a person p in a video clip t are denoted with $P_{p,t} \in \mathbb{R}^{3 \times |v pose|}$ and $F_{p,t} \in \mathbb{R}^{2 \times |v face|}$ respectively, and the corresponding reconstructed poses 418 and the reconstructed faces 420 are denoted with $\hat{P}_{p,t} \in \mathbb{R}^{3 \times |v pose|}$ and $\hat{F}_{p,t} \in \mathbb{R}^{3 \times |v face|}$ respectively. The network can then be trained using the loss function:

$$\mathcal{L} := \sum_p \sum_t \left( \|P_{p,t} - \hat{P}_{p,t}\|^2 + \|F_{p,t} - \hat{F}_{p,t}\|^2 \right) + \lambda(\|W_{pose}\| + \|W_{face}\|)$$

where λ is a regularization factor keeping the network parameters from rapidly expanding.

The loss function equation is minimized when the reconstructions match the inputs in the video clips with the highest scatter of the pose and face landmark locations. Further, since the feature representations with higher highlight scores weight more in generating the reconstructions, it follows that the network will learn to assign higher highlight scores to the video clips with the largest scatter of poses and face landmark locations, (i.e., at the most interesting parts of the video). As an extreme example, if the input video content has only five video clips, with three of the video clips showing people running and the remaining two video clips showing the people standing, then the network can learn a highlight score close to one (1) for the three video clips depicting the activity of running, and a highlight score close to zero (0) for the remaining two clips depicting the lesser activity.

As noted above, the pose highlight scores 126 and the face highlight scores 128 of the video clips 116 range from zero (0) to one (1). A pose highlight score 126 of one (1) indicates a higher level of activity depicted in a video clip 116 than a pose highlight score of zero (0). Similarly, a face highlight score 128 of one (1) indicates a higher level of activity depicted in the video clip 116 than a face highlight score of zero (0). In implementations, the video clips 116 of the video content 102 can be ranked for higher levels of activity to lower levels of activity depicted in the respective video clips based on the pose highlight scores 126 and the face highlight scores 128 of each of the video clips. Additionally, the video clips 116 can be filtered according to the ranking of the video clips for the higher levels of activity to the lower levels of activity depicted in the respective video clips.

Returning to the discussion of FIG. 1, and as described above, the second stage of the multimodal detection system 100 includes the class detection model 108 with the pose-based emotion recognition network 110, and the adaptive filtering system 112. The second stage of the multimodal detection system 100 utilizes pre-trained action and emotion recognition networks to detect classes 130 of different actions 132 and emotions 134 (e.g., emotion labels) in the video clips 116 of the video content 102. The class detection model 108 also determines action confidence scores 136 and emotion confidence scores 138 that indicate a detection confidence of the detected classes 130 of the respective actions 132 and the emotions 134 so that a set of highlight video clips generated as a highlight video can be dynamically changed and updated based on user inputs and selected viewing preferences.

In this example, the class detection model 108 implemented in the second stage of the multimodal detection system 100 receives various inputs from the components of the first stage of the multimodal detection system. The second stage inputs include the video clips 116 of the video content 102 that depict at least one person, as well as the pose highlight scores 126 and the face highlight scores 128 that correspond to each of the respective video clips. The second stage inputs to the class detection model 108 also include the tracked poses 122 and the tracked faces 124, as tracked and determined by the activity tracking model 104.

The class detection model 108 can then detect the actions 132 depicted in the video clips 116, where the actions 132 detected in the video clips 116 are based on the activities of the one or more persons depicted in the respective video clips. The class detection model 108 also detects the emotions 134 (e.g., emotion labels) exhibited by the persons depicted in the video clips 116. The emotions 134 detected in the video clips 116 are based on pose-based emotion features 140 corresponding to the respective video clips, as determined by the pose-based emotion recognition network 110 of the class detection model. The pose-based emotion features 140 include detected face emotions and detected pose emotions, and a pose-based emotion feature 140 indicates an emotion determined based on the poses 122 of the persons depicted in the video clips 116 of the video content.

The class detection model 108 can also determine an action confidence score 136 for each of the actions 132 detected in the video clips 116, where the action confidence score 136 for an action 132 indicates a degree to which the action occurs in the respective video clips of the video content. Similarly, the class detection model 108 can determine an emotion confidence score 138 for each of the emotions 134 detected in the video clips 116, where the emotion confidence score 138 for an emotion 134 indicates a degree to which the emotion occurs in the respective video clips of the video content.

Figure 5:
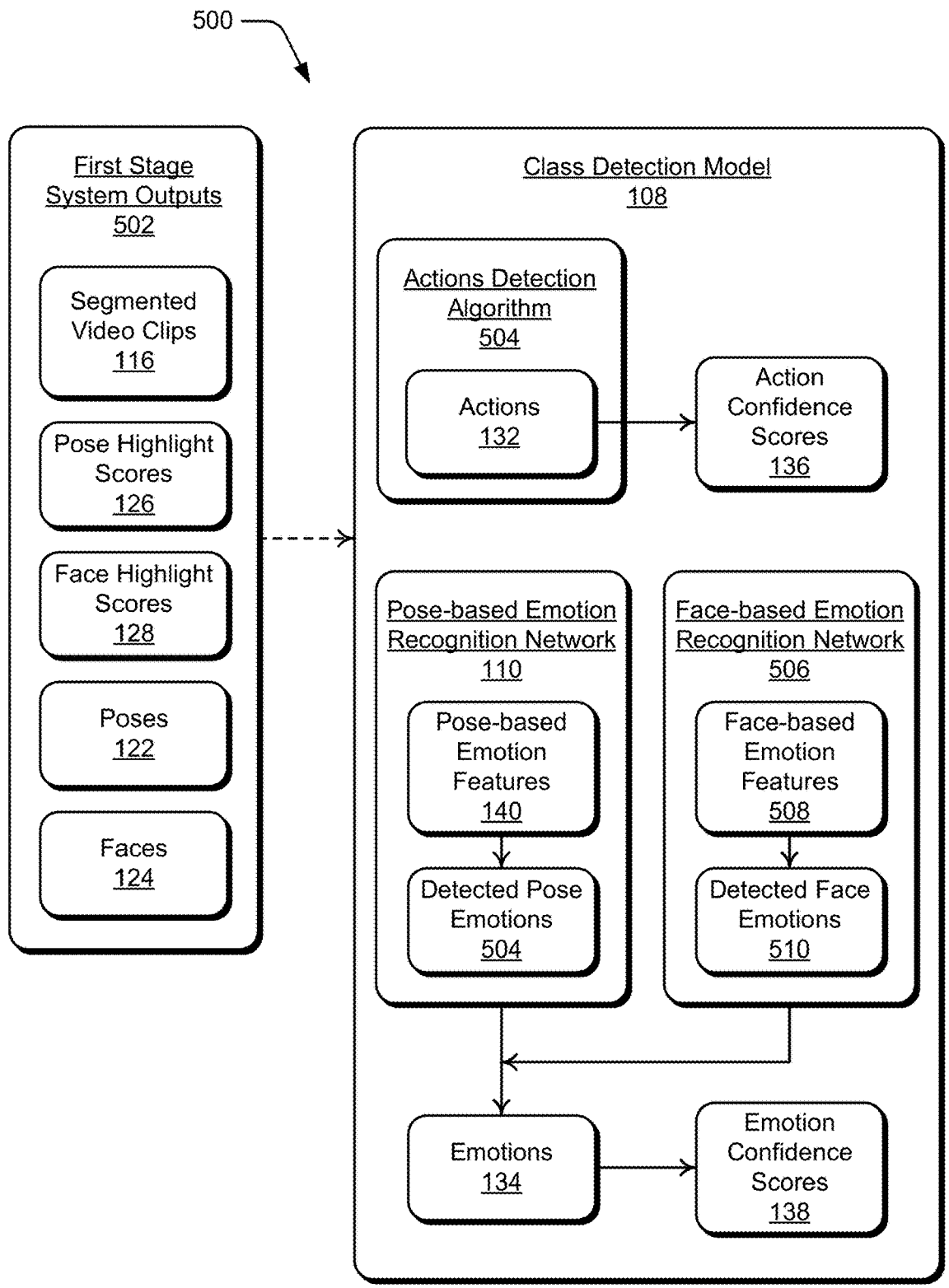
FIG. 5 further illustrates an example of features of a class detection model of the multimodal detection system implemented for a highlight video generated with adaptable multimodal customization, as described herein.

FIG. 5 further illustrates an example 500 of features of the class detection model 108 implemented in the multimodal detection system 100 to detect the classes of the actions 132 and the emotions 134 for each of the video clips 116 that depict at least one person in the video content 102. As described above, the class detection model 108 receives the first stage system outputs 502 of the multimodal detection system 100, which are the second stage inputs to the class detection model 108. The first stage system outputs 502 include the segmented video clips 116 of the video content 102 that depict the person or persons engaged in the human-centric activities, and include the pose highlight scores 126 and the face highlight scores 128 that correspond to each of the respective video clips, as determined by the autoencoder system 106. The first stage system outputs 502 also include the tracked poses 122 and the tracked faces 124, as determined by the activity tracking model 104.

In this example 500, the class detection model 108 includes an actions detection algorithm 504 to detect the actions 132 based on the human activities 118 depicted in the video clips 116 of the video content 102. In an implementation, the actions detection algorithm 504 detects the actions 132 based on the tracked poses 122 and the tracked faces 124 of the persons depicted in the video clips 116 using multiple layers of spatial temporal graph convolutional networks (ST-GCNs), which also generate the action confidence scores 136. An example implementation of action recognition is described and detailed in the document "Slowfast Networks for Video Recognition" by Feichtenhofer et al. (Proceedings of the IEEE/CVF International Conference on Computer Vision, 2019, pp. 6202-6211), which is incorporated by reference herein. Notably, the network architecture for action recognition is illustrated in figure one and described in section three of the document.

In this example 500, the class detection model 108 includes the pose-based emotion recognition network 110 to determine the pose-based emotion features 140, from which detected pose emotions 504 of the pose-based emotion features 140 are determined. Similarly, the class detection model 108 includes a face-based emotion recognition network 506 to determine face-based emotion features 508, from which detected face emotions 510 of the face-based emotion features 508 are determined. The class detection model 108 can then combine the detected pose emotions 504 and the detected face emotions 510 to obtain the emotion classes, determined as the emotions 134 exhibited or expressed by the one or more persons depicted in the video clips 116 of the video content 102. The emotion confidence score 138 for each of the emotions 134 detected in the video clips 116 of the video content is also determined, where the emotion confidence score 138 for an emotion 134 indicates a degree to which the emotion occurs in the video clips.

To perform the pose-based emotion recognition, the features learned as the actions 132 from the neural network for pose-based action recognition (e.g., the actions detection algorithm 504) are combined with the determined pose-based emotion features 140 and the face-based emotion features 508, and the combined features are then transformed to emotion label probabilities using a set of fully-connected layers in the pose-based emotion recognition network 110. Each input to the pose-based emotion recognition network 110 is a tuple (c, e), where c is the video clip 116 and e is the emotion label associated with the video clip 116. For every video clip c, the actions detection algorithm 504 is utilized, denoted with a function $f_{action}$ to obtain features $f_c$ as: $f_c = f_{action}(c)$.

The combined feature of $h_c = [f_c; \alpha_c]$ is generated, where [.;.] denotes appending the vectors, one below the other. The combined features $h_c$ are then passed through the fully connected layers, denoted collectively with the function FC, to obtain the predicted emotion labels $e_{pred}$ as: $e_{pred} = FC(h_c)$. The pose-based emotion recognition network 110 can be trained using the cross-entropy loss between the predicted emotion labels $e_{pred}$ and the provided emotion labels e.

Figure 6:
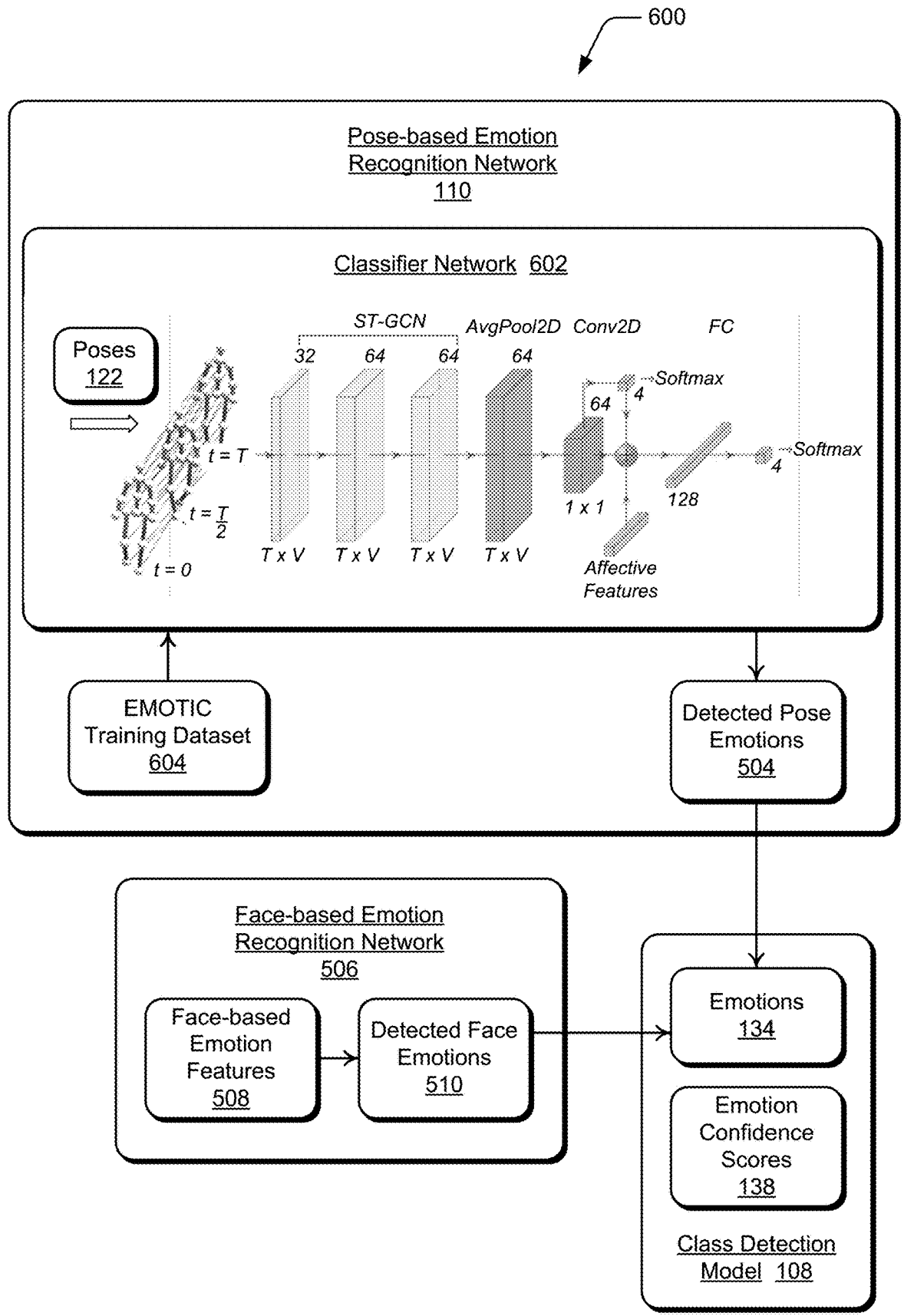
FIG. 6 further illustrates an example of features of a pose-based emotion recognition network of the multimodal detection system implemented for a highlight video generated with adaptable multimodal customization, as described herein.

FIG. 6 further illustrates an example 600 of features of the pose-based emotion recognition network 110 implemented as part of the class detection model 108 in the multimodal detection system 100 to determine the pose-based emotion features 140 for each of the video clips 116 that depict the person or persons engaged in the human-centric activities. As described above, the pose-based emotion recognition network 110 receives one or more of the first stage system outputs 502 of the multimodal detection system 100, which includes the poses 122 of the persons depicted in the video clips 116 of the video content 102. In this example 600, the pose-based emotion recognition network 110 is a deep-learning-based architecture for emotion recognition from non-verbal, pose-based expressions, lending to detection of the emotion classes from the video clips 116 of the video content.

An example implementation of the face-based emotion recognition network 506 is described and detailed in the document "Facial Expression Recognition Based on Deep Convolutional Neural Network" by Wang et al. (2018 IEEE 8th Annual International Conference on CYBER Technology in Automation, Control, and Intelligent Systems (CYBER), Tianjin, China, 2018, pp. 629-634, doi: 10.1109/CYBER.2018.8688050), which is incorporated by reference herein.

The pose-based emotion recognition network 110 is implemented with a classifier network 602, which is shown and described in the document "STEP: Spatial Temporal Graph Convolutional Networks for Emotion Perception from Gaits" by U. Bhattacharya et al. (Proceedings of the Thirty-Fourth AAAI Conference on Artificial Intelligence (AAAI-20), AAAI Press, 2020, p. 1342-1350). The classifier network 602 is implemented as a spatial temporal graph convolutional network (ST-GCN) architecture, and the classifier network 602 is trained using the EMOTIC (Emotions In Context) training dataset 604, which consists of pose-based images annotated with emotions. The classifier network 602 learns to associate emotions with the pose-based features. The class detection model 108 combines the detected pose emotions 504 and the detected face emotions 510 to determine the overall emotion class prediction (e.g., the emotions 134) and the corresponding emotion confidence scores 138.

In aspects of determining the detected pose emotions, the person or persons who are depicted in the video clips 116 can appear at different scales depending on their proximity to the camera when the video content 102 is captured. Accordingly, the pose-based emotion recognition network 110 uses a set of scale independent affective features, similar to the scale-independent affective features considered for emotion recognition as described and detailed in the document "Take an Emotion Walk: Perceiving Emotions from Gaits Using Hierarchical Attention Pooling and Affective Mapping" by U. Bhattacharya et al. (European Conference on Computer Vision, Springer, 2020). Specifically, the pose-based emotion recognition network 110 utilizes angles, distance ratios, and area ratios as listed in the table below, where the full set of affective features are denoted for every clip c with αc.

| | |
|---|---|
| Angles between: | Hands at root |
| | Head and left shoulder at neck |
| | Head and right shoulder at neck |
| | Left shoulder and left hand at left elbow |
| | Right shoulder and right hand at right elbow |
| | Left hip and left toe at left knee |
| | Right hip and right toes at right knee |
| Distance ratios between: | Left hand to spine base and right hand to spine base |
| | Head to spine base and shoulder to shoulder |
| | Left shoulder to left hand and right shoulder to right hand |
| | Left toe to spine base and right toe to spine base |
| | Left hip to left toe and right hip to right toe |
| Area ratios between: | Neck, left hand, right hand and |
| | Spine base, left shoulder, right shoulder |
| | Spine base, left hip, right hip and |
| | Spine base, left toe, right toe |
| | Left hand, spine base, left toe and |
| | Right hand, spine base, right toe |

Returning to the discussion of FIG. 1, the adaptive filtering system 112 of the multimodal detection system 100 also receives various inputs from the components of the first stage of the multimodal detection system, as well as inputs from the class detection model 108. The adaptive filtering system 112 is implemented to rank the video clips 116 of the video content 102 for higher levels of activity to lower levels of activity of the persons depicted in the respective video clips based on the pose highlight scores 126 and the face highlight scores 128 of each of the video clips. The adaptive filtering system 112 can also filter the ranked video clips 140 as the filtered video clips 142. In implementations, the ranked video clips 140 can be filtered based on the action confidence score 136 for each of the respective ranked video clips and/or filtered based on the emotion confidence score 138 for each of the respective ranked video clips.

The adaptive filtering system 112 operates in conjunction with receiving user selection inputs 144 via the user interface 114 to select one or more of the detected actions 132 and/or one or more of the detected emotions 134, as determined at the class detection model 108 from the video clips 116 of the video content 102. A user of the computing device that implements the multimodal detection system 100 can interactively select a minimum highlight score threshold in the user interface 114, so that the highlight video 146 will be generated to include only the video clips 116 that have at least that minimum highlight score (e.g., the pose highlight score 126 and/or the face highlight score 128). The higher the selected minimum of the highlight score threshold by the user, the fewer video clips 116 that will be included in the generation of the highlight video 146. In an alternative or additional implementation, a user selection input 144 may designate a specific duration of time for playback viewing of the highlight video 146, in which case the video clips 116 with the highest highlight scores that fit into the designated time duration are used to generate the highlight video.

The user can also choose a subset of the actions 132 and/or the emotions 134 categories on which to focus, as further user selection inputs 144 via the user interface 114. This initiates the adaptive filtering system 112 to filter, or refilter, the ranked video clips 140 to generate an updated set of filtered video clips 142, thus changing the highlight score distribution of the video clips on-the-fly to reflect the highlight scores for only the selected categories (e.g., the detected classes 130 of the actions 132 and the emotions 134). This ranking mechanism based on the user selection inputs 144 at the user interface 114 provides a very efficient user experience for the user wanting to preview the relevant highlight video clips 116 according to his or her creative needs and subjective input. The multimodal detection system 100 automatically detects the poses and emotions, and the user can then dial down the pose importance and dial up the emotion importance (or vice-versa). The overall system is conducive to having user input as a selective factor, and is configurable as to the resulting output generated as the highlight video 146, which includes the ranked and filtered video clips 142 of the video content.

Figure 7:
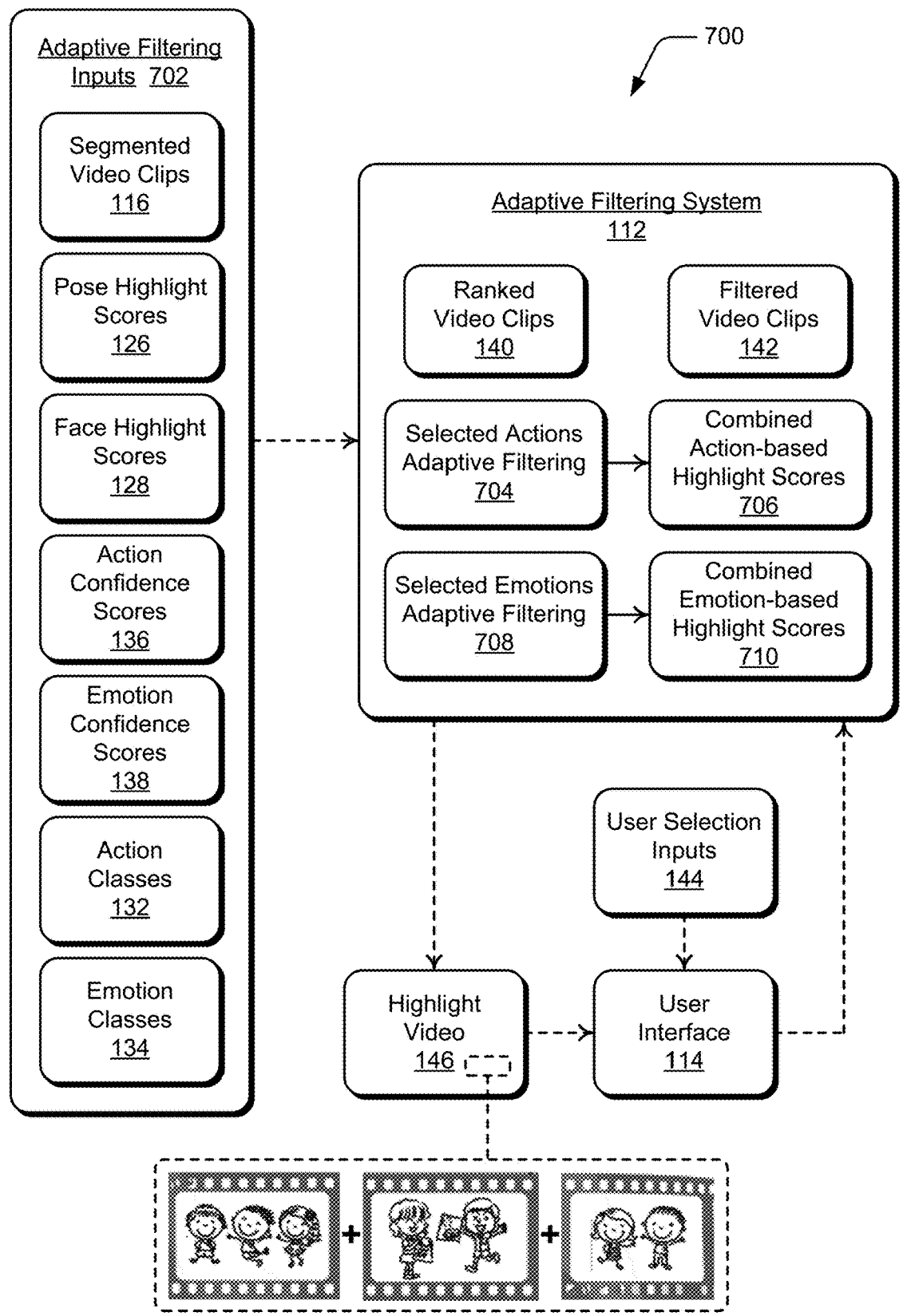
FIGS. 7 and 8 further illustrate examples of features of an adaptive filtering system of the multimodal detection system implemented for a highlight video generated with adaptable multimodal customization, as described herein.

FIG. 7 further illustrates an example 700 of features of the adaptive filtering system 112 implemented in the multimodal detection system 100. As described above, the adaptive filtering system 112 receives various inputs from the components of the first stage of the multimodal detection system, as well as inputs from the class detection model 108. In this example, the adaptive filtering inputs 702 include the segmented video clips 116 of the video content 102 that depict at least one person, as well as the pose highlight scores 126 and the face highlight scores 128 that correspond to each of the respective video clips, as determined by the autoencoder system 106. The adaptive filtering inputs 702 also include the actions 132 (e.g., the detected action classes) and the emotions 134 (e.g., the detected emotion classes) as detected by the class detection model 108, as well as the action confidence scores 136 and the emotion confidence scores 138.

In this example 700, the adaptive filtering system 112 generates the ranked video clips 140 by ranking the video clips 116 of the video content 102 based on the relative levels of interest in the activities of the one or more persons depicted in the respective video clips based on the pose highlight scores 126 and the face highlight scores 128 of each of the video clips. The adaptive filtering system 112 also generates the filtered video clips 142 by filtering the ranked video clips 140 based on the action confidence score 136 for each of the respective ranked video clips and/or filtered based on the emotion confidence score 138 for each of the respective ranked video clips.

In implementations, the adaptive filtering system 112 includes selected actions adaptive filtering 704, which generates combined action-based highlight scores 706. Similarly, the adaptive filtering system 112 includes selected emotions adaptive filtering 708, which generates combined emotion based highlight scores 710. The selected actions adaptive filtering 704 and the selected emotions adaptive filtering 708 is further shown and described with reference to FIG. 8.

The adaptive filtering system 112 can receive the user selection inputs 144 via the user interface 114, such as a first user input selection of one or more of the actions 132 detected in the video clips 116 of the video content 102. The adaptive filtering system 112 can then filter the video clips based on the selected actions according to the ranking of the video clips. The adaptive filtering system 112 can also receive a second user input via the user interface 114 as a selection of one or more of the emotions 134 exhibited by the one or more persons depicted in the video clips of the video content. The adaptive filtering system 112 can then filter the ranked video clips 140 based on the selected emotions. The adaptive filtering system 112 then generates the highlight video 146 of the ranked and filtered video clips that depict the selected actions and include the selected emotions.

Figure 8:
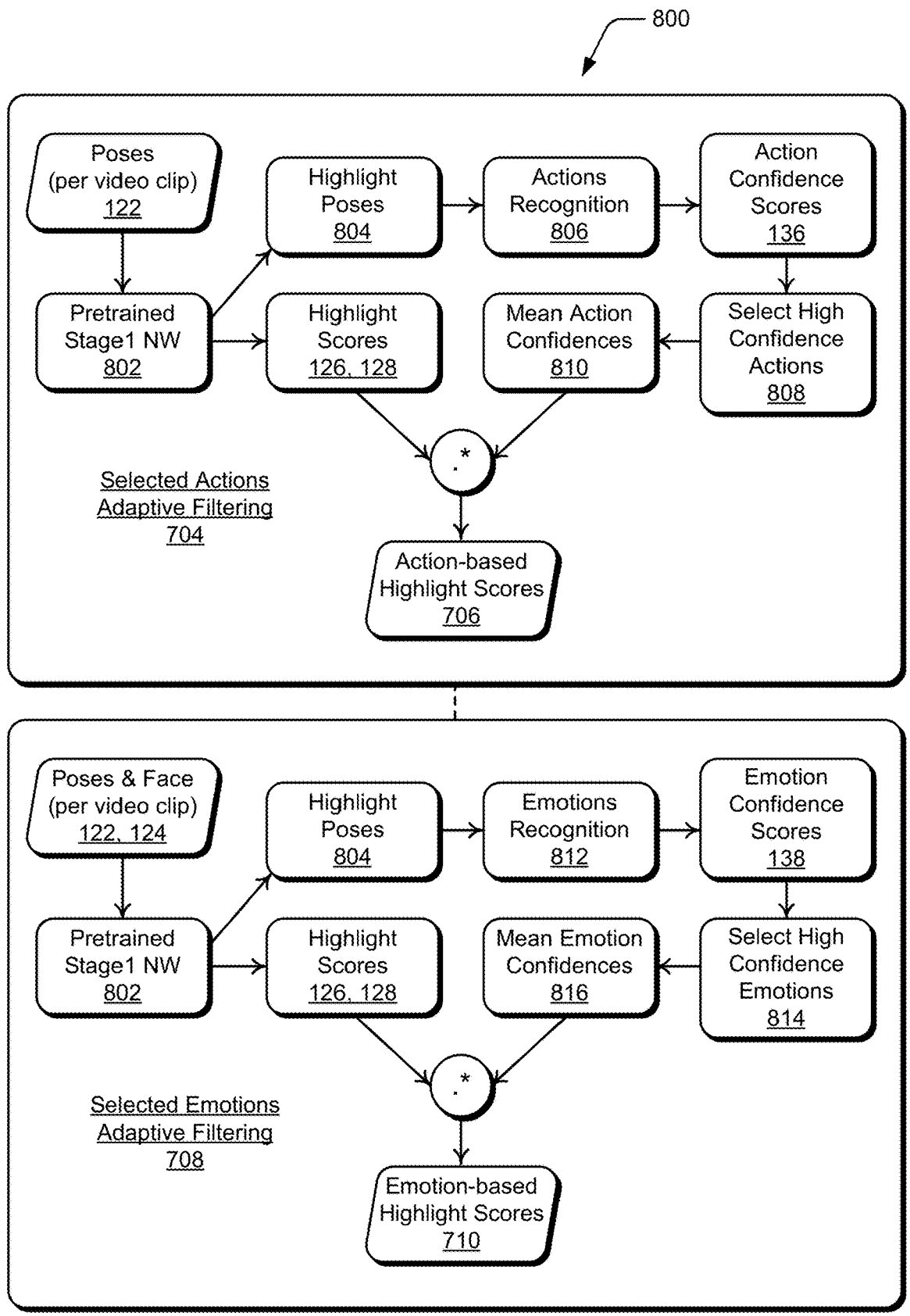

FIG. 8 further illustrates an example 800 of the network implementation of the adaptive filtering system 112, as shown and described above with reference to FIG. 7. The network implementation includes the components of the selected actions adaptive filtering 704 and the components of the selected emotions adaptive filtering 708. In this example, the selected actions adaptive filtering 704 integrates the pretrained first stage network 802 (e.g., the first stage of the multimodal detection system 100), which includes the activity tracking model 104 and the autoencoder system 106. As an input, the pretrained first stage network 802 receives the poses 122 (per video clip 116) from the activity tracking model 104, and generates a set of the video clips that include highlight poses 804. The pretrained first stage network 802 also generates the pose highlight scores 126 and the face highlight scores 128.

The class detection model 108 of the multimodal detection system 100 detects the actions 132 as the actions recognition 806, and also determines the action confidence scores 136 that indicate a detection confidence of the detected classes 130 of the actions. The selected actions adaptive filtering 704 filters and selects the high confidence actions 808, and determines mean action confidences 810. A pointwise multiplication of the mean action confidences 810 and the highlight scores 126, 128 result in the combined action-based highlight scores 706 generated by the selected actions adaptive filtering 704. The combined action-based highlight scores 706 are the combined highlight scores (e.g., a combination of both pose and face highlight scores) of each video clip 116 weighted by the mean action confidences 810, which is computed based on all of the detected action classes 130 being included in the user selection input as a threshold minimum, followed by the detected classes 130 of the actions 132 selected by the user in the user interface 114.

Similarly, the selected emotions adaptive filtering 708 integrates the pretrained first stage network 802 (e.g., the first stage of the multimodal detection system 100), which includes the activity tracking model 104 and the autoencoder system 106. As an input, the pretrained first stage network 802 receives the poses 122 and faces 124 (per video clip 116) from the activity tracking model 104, and generates a set of the video clips that include highlight poses 804. The pretrained first stage network 802 also generates the pose highlight scores 126 and the face highlight scores 128.

The class detection model 108 of the multimodal detection system 100 detects the emotions 134 as the emotions recognition 812, and also determines the emotion confidence scores 138 that indicate a detection confidence of the detected classes 130 of the emotions. The selected emotions adaptive filtering 708 filters and selects the high confidence emotions 814, and determines mean emotion confidences 816. A pointwise multiplication of the mean emotion confidences 816 and the highlight scores 126, 128 result in the combined emotion-based highlight scores 710 generated by the selected emotions adaptive filtering 708. The combined emotion-based highlight scores 710 are the combined pose and face highlight scores of each video clip 116 weighted by the mean emotion confidences 816, which is computed based on all of the detected emotion classes 130 being included in the user selection input as a threshold minimum, followed by the detected classes 130 of the emotions 134 selected by the user in the user interface 114.

Figure 9:
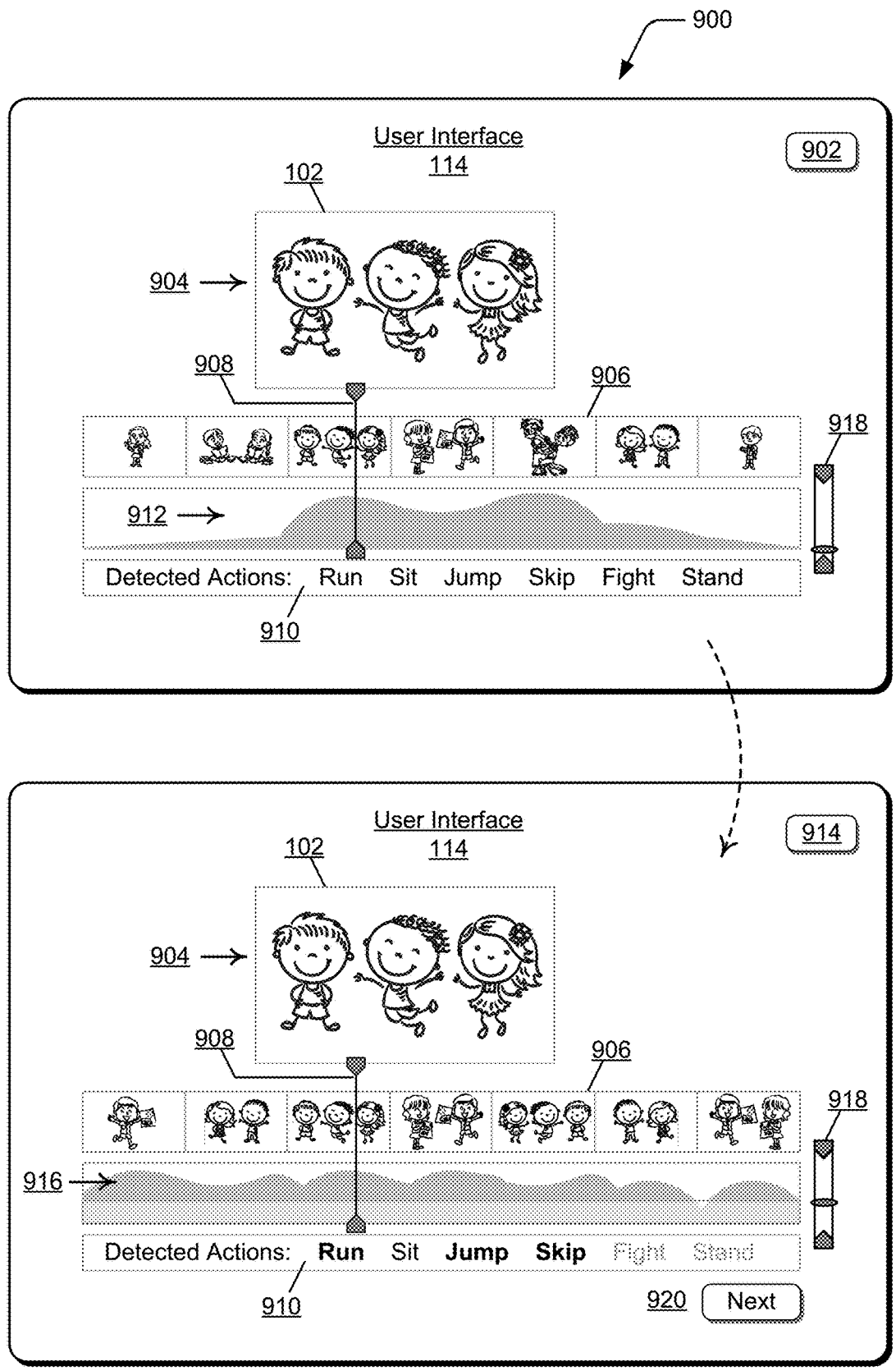
FIGS. 9 and 10 illustrate examples of a user interface of the multimodal detection system implemented for a highlight video generated with adaptable multimodal customization, as described herein.

FIG. 9 illustrates examples 900 of the user interface 114 in the multimodal detection system 100, implemented for a highlight video generated with adaptable multimodal customization, as described herein. In an example 902, the user interface 114 includes a display 904 of the input video content 102, as well as a sequence of thumbnail images 906 of the keyframes from the captured video content. In this example, the user interface 114 also includes a horizontal slider 908 that the user can touch-select to browse the thumbnail images 906 of the keyframes. The actions 132 detected by the class detection model 108 are displayed in an actions list 910 for user selection in the user interface. In an implementation, the actions list 910 may be scrollable to display all of the actions 132 detected from the activity depicted in the video clips 116 of the video content 102. Alternatively, the actions 132 having the higher pose highlight scores 126, face highlight scores 128, and/or action confidence scores 136 are displayed in the actions list 910, such as the five detected actions listed in this example. Additionally, the user interface 114 includes a distribution 912 as a visual representation of the highlight scores, and correlation of the highlight scores with the keyframes of the input video content 102, which are displayed above the distribution 912 in the sequence of thumbnail images 906.

In an example 914 of the user interface 114, the user has selected three of the detected actions 132 as displayed in bold text in the actions list 910. Notably, the distribution 912 also changes and an updated distribution 916 of the highlight scores is displayed based on the user selected actions 132 from the actions list. Additionally, the sequence of thumbnail images 906 of the keyframes from the captured video content also updates to reflect the action selections. The user can select and unselect any of the detected actions in the actions list 910 based on the user's viewing preferences of the content depicted in the original captured video. It should be noted that the user can still select one of the lesser actions that may be of a lower priority, yet of importance or relevant to the user. Accordingly, the highlighting is both reflective of the captured video content and relevant to the user. The user interface 114 also includes a filter threshold slider 918 (illustrated in both examples 902 and 914), which the user can slide up or down to further refine the video clips 116 that will be extracted and used by the adaptive filtering system 112 to generate the highlight video 146. The user can then finalize the selection of the one or more actions 132 by user input of the "Next" selector 920, which transitions the display of the user interface 114 as shown and described with reference to FIG. 10.

Figure 10:
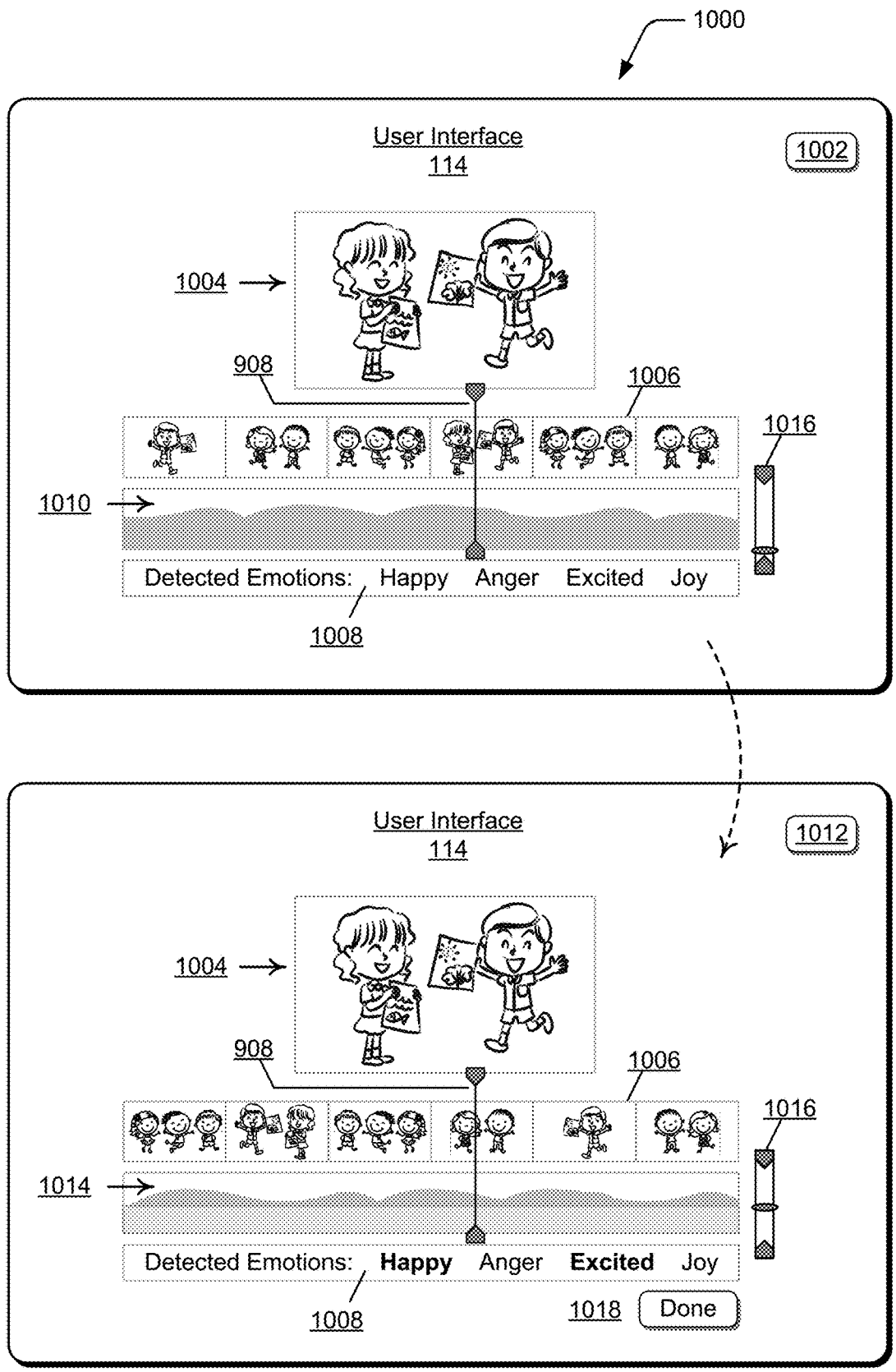

FIG. 10 further illustrates examples 1000 of the user interface 114 in the multimodal detection system 100, implemented for a highlight video generated with adaptable multimodal customization, as described herein. In an example 1002, the user interface 114 includes a display 1004 of the input video content 102 refined down to the merged video clips 116 that depict the user selected actions 132, as described above with reference to the examples shown in FIG. 9. The user interface 114 also displays a sequence of thumbnail images 1006 of the keyframes from the refined video content of the video clips 116 that correspond to the selected actions. The user interface 114 also includes the horizontal slider 908 that the user can touch-select to browse the thumbnail images 1006 of the keyframes.

The emotions 134 detected by the class detection model 108 are displayed in an emotions list 1008 for user selection in the user interface. In an implementation, the emotions list 1008 may be scrollable to display all of the emotions 134 exhibited or expressed by the persons depicted in the video clips 116 of the video content 102. Alternatively, the emotions 134 having the higher emotion confidence scores 138 are displayed in the emotions list 1008, such as the five detected emotions listed in this example. Additionally, the user interface 114 includes a distribution 1010 as a visual representation of the highlight scores, and correlation of the highlight scores with the keyframes of the refined video content, which are displayed above the distribution 1010 in the sequence of thumbnail images 1006.

In an example 1012 of the user interface 114, the user has selected three of the detected emotions 134 as displayed in bold text in the emotions list 1008. Notably, the distribution 1010 also changes and an updated distribution 1014 of the highlight scores is displayed based on the user selected emotions 134 from the emotions list. Additionally, the sequence of thumbnail images 1006 of the keyframes from the captured video content also updates to reflect the emotion selections. The user can select and unselect any of the detected emotions in the emotions list 1008 based on the user's viewing preferences of the emotions exhibited or expressed by the persons depicted in the original captured video. It should be noted that the user can still select one of the lesser emotions that may be of a lower priority, yet of importance or relevant to the user. Accordingly, the highlighting is both reflective of the captured video content and relevant to the user.

The user interface 114 also includes a filter threshold slider 1016 (illustrated in both examples 1002 and 1012), which the user can slide up or down to further refine the video clips 116 that will be extracted and used by the adaptive filtering system 112 to generate the highlight video 146. The user can then finalize the selection of the one or more emotions 134 by user input of the "Done" selector 1018, which initiates the adaptive filtering system 112 to generate the highlight video, such as described above with reference to FIG. 7. The adaptive filtering system 112 filters the ranked video clips 140 for higher levels of activity based on the ranked video clips that also include the one or more selected emotions, and generates the highlight video 146 of the ranked and filtered video clips that depict the selected actions and include the selected emotions.

Example methods 1100, 1200, and 1300 are described with reference to respective FIGS. 11, 12, and 13 in accordance with one or more aspects of a highlight video generated with adaptable multimodal customization. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 11:
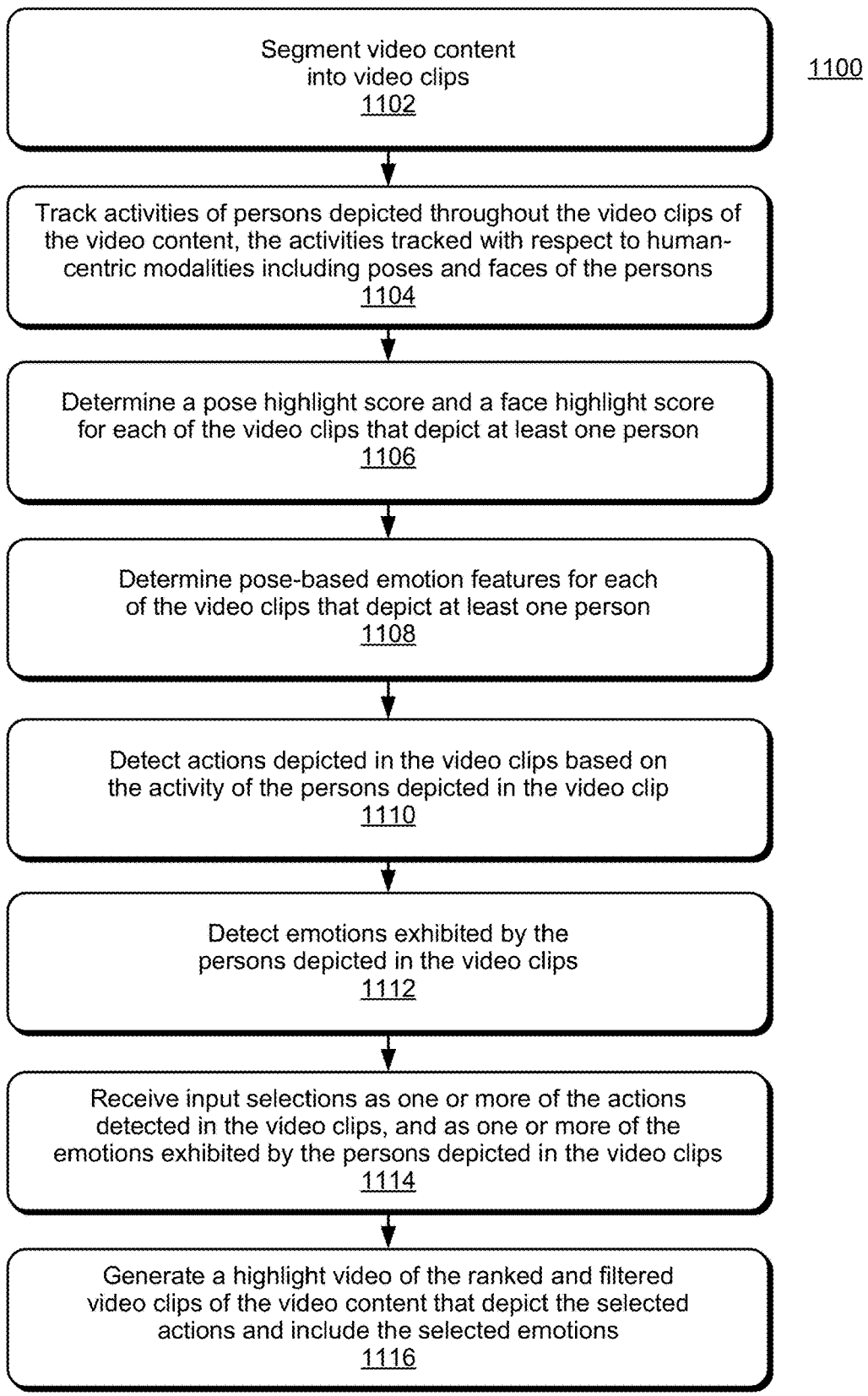
FIGS. 11-13 illustrate example methods of a highlight video generated with adaptable multimodal customization in accordance with one or more implementations.

FIG. 11 illustrates example method(s) 1100 for a highlight video generated with adaptable multimodal customization, and is generally described with reference to the multimodal detection system implemented by a computing device as shown and described with reference to FIGS. 1-10. The order in which the method is described is not intended to be construed as a limitation, and any number or combination of the method operations can be combined in any order to implement a method, or an alternate method.

At 1102, video content is received and segmented into video clips. For example, the activity tracking model 104 of the multimodal detection system 100 receives the video content 102 as an input to the system, and the video segmenter 202 segments the video content into a sequence of video clips as the segmented video clips 116. The video content 102 can be segmented into the sequence of video clips 116 based on a designated duration, such as in half-second durations, one second durations, five second durations, etc. Alternatively or in addition, the duration of the video clips 116 may be based on a continuity of the action depicted in the video content 102, given that activity may be relatively slow or relatively fast depending on the intended subject tracking in the video content.

At 1104, activities of persons depicted throughout the video clips of the video content are tracked with respect to human-centric modalities including poses and faces of the persons. For example, the activity tracking model 104 of the multimodal detection system 100 implements a multi-person tracker and utilizes the pose extraction algorithm 204 to track and graph the poses 122 of each person depicted in a video clip 116 of the video content 102. Similarly, the activity tracking model 104 utilizes the face extraction algorithm 206 to track and graph the faces 124 of each person depicted in a video clip 116 of the video content.

At 1106, a pose highlight score and a face highlight score are determined for each of the video clips that depict at least one person. For example, the autoencoder system 106 of the multimodal detection system 100 determines a pose highlight score 126 for each of the video clips 116 that depict at least one person, where the pose highlight score 126 of a video clip 116 represents a relative level of interest in an activity based on the poses 122 of one or more persons depicted in the video clip. The autoencoder system 106 also determines a face highlight score 128 for each of the video clips 116 that depict at least one person, where the face highlight score 128 of a video clip 116 represents a relative level of the interest in the activity based on the tracked faces 124 of one or more persons depicted in the video clip.

The pose highlight scores 126 of the video clips 116 range from zero (0) to one (1), and a pose highlight score 126 of one indicates a higher level of activity depicted in the video clip than a pose highlight score of zero. Similarly, the face highlight scores 128 of the video clips 116 range from zero (0) to one (1), and a face highlight score 128 of one indicates a higher level of activity depicted in the video clip than a face highlight score of zero. The video clips 116 of the video content 102 can be ranked for higher levels of activity to lower levels of activity depicted in the respective video clips based on the pose highlight scores 126 and the face highlight scores 128 of each of the video clips.

At 1108, pose-based emotion features are determined for each of the video clips that depict at least one person. For example, the pose-based emotion recognition network 110 of the multimodal detection system 100 determines the pose-based emotion features 140 for each of the video clips that depict at least one person, where a pose-based emotion feature 128 of a video clip 116 indicates an emotion determined based on the tracked poses 122 of the one or more persons depicted in the video clip.

At 1110, actions depicted in the video clips are detected based on the activities of the persons depicted in the respective video clips. For example, the class detection model 108 of the multimodal detection system 100 implements the actions detection algorithm 504 which detects the actions 132 based on the tracked poses 122 and the tracked faces 124 of the persons depicted in the video clips 116. In implementations, the actions detection algorithm 504 uses multiple layers of spatial temporal graph convolutional networks (ST-GCNs), which also generate the action confidence scores 136 corresponding to the detected actions 132. An action confidence score 136 is determined for each of the actions 132 detected in the video clips 116, where the action confidence score 136 for an action 132 indicates a degree to which the action occurs in the video clips of the video content.

At 1112, emotions exhibited by the persons depicted in the video clips are detected. For example, the class detection model 108 of the multimodal detection system 100 implements the pose-based emotion recognition network 110 to detect the classes of the emotions 134 expressed or exhibited by the one or more persons depicted in the video clips 116 of the video content 102. The pose-based emotion recognition network 110 detects the emotions 134 in a video clip 116 based on the pose-based emotion features 140 corresponding to the video clip. The pose-based emotion recognition network 110 also determines the emotion confidence score 138 for each of the emotions 134 detected in the video clips 116 of the video content, where the emotion confidence score 138 for an emotion 134 indicates a degree to which the emotion occurs in the video clips.

At 1114, input selections are received as one or more of the actions detected in the video clips, and as one or more of the emotions exhibited by the persons depicted in the video clips. For example, the multimodal detection system 100 includes the user interface 114, which displays the more relevant (occurring most often) actions 132 and/or emotions 134 detected in the video clips 116 of the video content 102, and the user selection inputs 144 are received in the user interface as one or more of the actions 132 depicted in the video clips 116 and/or as one or more of the emotions 134 expressed or exhibited by the persons depicted in the video clips. The video clips are filtered by the adaptive filtering system 112 based on the selected actions 132 according to the ranking of the video clips for higher levels of activity to lower levels of activity depicted in the respective video clips. Additionally, the ranked video clips 140 are filtered by the adaptive filtering system 112 based on the action confidence score 136 for each of the ranked video clips. The ranked video clips 140 can also be ranked for higher levels of activity based on the ranked video clips that also include the selected emotions 134, and the ranked video clips are filtered based on the emotion confidence score 138 for each of the ranked video clips.

At 1116, a highlight video is generated from the ranked and filtered video clips of the video content that depict the selected actions and include the selected emotions. For example, the adaptive filtering system 112 of the multimodal detection system 100 generates the highlight video 146 from the ranked and filtered video clips 142 of the video content 102 that depict the user selected actions 132 and include the user selected emotions 134. The adaptive filtering system 112 operates in conjunction with receiving the user selection inputs 144 via the user interface 114 to select the actions and emotions, and filters the ranked video clips 140 to generate an updated set of filtered video clips 142, from which the highlight video 146 is generated.

Figure 12:
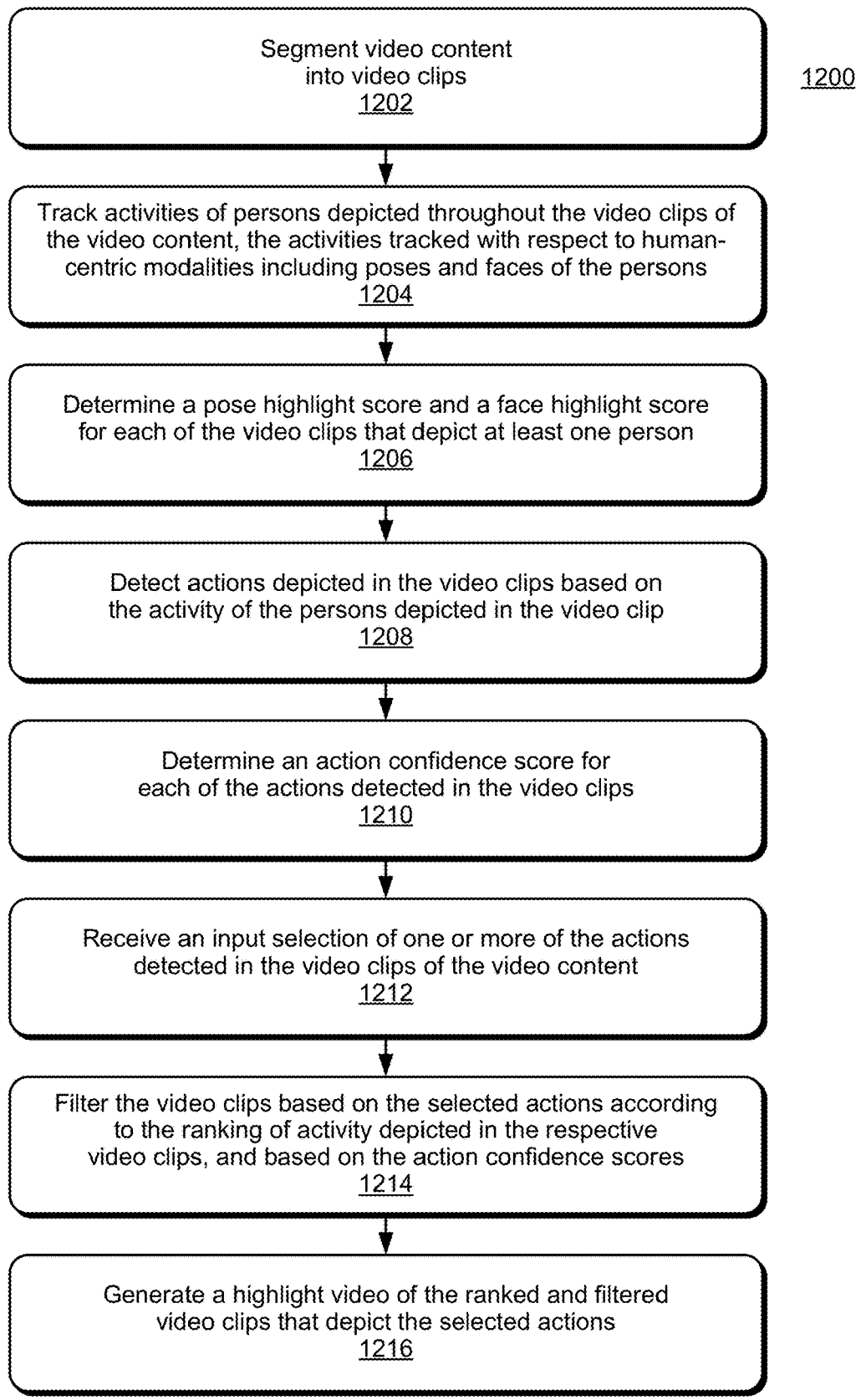

FIG. 12 illustrates example method(s) 1200 for a highlight video generated with adaptable multimodal customization, and is generally described with reference to the multimodal detection system implemented by a computing device as shown and described with reference to FIGS. 1-10. The order in which the method is described is not intended to be construed as a limitation, and any number or combination of the method operations can be combined in any order to implement a method, or an alternate method.

At 1202, video content is received and segmented into video clips. For example, the activity tracking model 104 of the multimodal detection system 100 receives the video content 102 as an input to the system, and the video segmenter 202 segments the video content into a sequence of video clips as the segmented video clips 116. The video content 102 can be segmented into the sequence of video clips 116 based on a designated duration, such as in half-second durations, one second durations, five second durations, etc. Alternatively or in addition, the duration of the video clips 116 may be based on a continuity of the action depicted in the video content 102, given that activity may be relatively slow or relatively fast depending on the intended subject tracking in the video content.

At 1204, activities of persons depicted throughout the video clips of the video content are tracked with respect to human-centric modalities including poses and faces of the persons. For example, the activity tracking model 104 of the multimodal detection system 100 implements a multi-person tracker and utilizes the pose extraction algorithm 204 to track and graph the poses 122 of each person depicted in a video clip 116 of the video content 102. Similarly, the activity tracking model 104 utilizes the face extraction algorithm 206 to track and graph the faces 124 of each person depicted in a video clip 116 of the video content.

At 1206, a pose highlight score and a face highlight score are determined for each of the video clips that depict at least one person. For example, the autoencoder system 106 of the multimodal detection system 100 determines a pose highlight score 126 for each of the video clips 116 that depict at least one person, where the pose highlight score 126 of a video clip 116 represents a relative level of interest in an activity based on the poses 122 of one or more persons depicted in the video clip. The autoencoder system 106 also determines a face highlight score 128 for each of the video clips 116 that depict at least one person, where the face highlight score 128 of a video clip 116 represents a relative level of interest in an activity based on the tracked faces 124 of one or more persons depicted in the video clip.

The pose highlight scores 126 of the video clips 116 range from zero (0) to one (1), and a pose highlight score 126 of one indicates a higher level of activity depicted in the video clip than a pose highlight score of zero. Similarly, the face highlight scores 128 of the video clips 116 range from zero (0) to one (1), and a face highlight score 128 of one indicates a higher level of activity depicted in the video clip than a face highlight score of zero. The video clips 116 of the video content 102 can be ranked for higher levels of activity to lower levels of activity depicted in the respective video clips based on the pose highlight scores 126 and the face highlight scores 128 of each of the video clips.

At 1208, actions depicted in the video clips are detected based on the activities of the persons depicted in the respective video clips. For example, the class detection model 108 of the multimodal detection system 100 implements the actions detection algorithm 504 which detects the actions 132 based on the tracked poses 122 and the tracked faces 124 of the persons depicted in the video clips 116.

At 1210, an action confidence score is determined for each of the actions detected in the video clips. For example, the class detection model 108 of the multimodal detection system 100 implements the actions detection algorithm 504 which detects the actions 132, and in implementations, uses multiple layers of spatial temporal graph convolutional networks (ST-GCNs) that also generate the action confidence scores 136 corresponding to the detected actions 132. An action confidence score 136 is determined for each of the actions 132 detected in the video clips 116, where the action confidence score 136 for an action 132 indicates a degree to which the action occurs in the video clips of the video content.

At 1212, an input is received as a selection of one or more of the actions detected in the video clips of the video content. For example, the multimodal detection system 100 includes the user interface 114, which displays the more relevant (occurring most often) actions 132 detected in the video clips 116 of the video content 102, and the user selection inputs 144 are received in the user interface as selections of one or more of the actions 132 depicted in the video clips 116.

At 1214, the video clips are filtered based on the selected actions according to the ranking of activity depicted in the respective video clips, and based on the action confidence scores. For example, the adaptive filtering system 112 of the multimodal detection system 100 filters the video clips 116 based on the selected actions 132 according to the ranking of the video clips for higher levels of activity to lower levels of activity depicted in the respective video clips. Additionally, the ranked video clips 140 are filtered by the adaptive filtering system 112 based on the action confidence score 136 for each of the ranked video clips. The video clips 116 of the video content 102 can be ranked based on the pose highlight scores 126 and the face highlight scores 128 of each of the video clips.

At 1216, a highlight video is generated from the ranked and filtered video clips that depict the selected actions. For example, the adaptive filtering system 112 of the multimodal detection system 100 generates the highlight video 146 from the ranked and filtered video clips 142 of the video content 102 that depict the user selected actions 132. The adaptive filtering system 112 operates in conjunction with receiving the user selection inputs 144 via the user interface 114 to select the actions, and filters the ranked video clips 140 to generate an updated set of filtered video clips 142, from which the highlight video 146 is generated.

Figure 13:
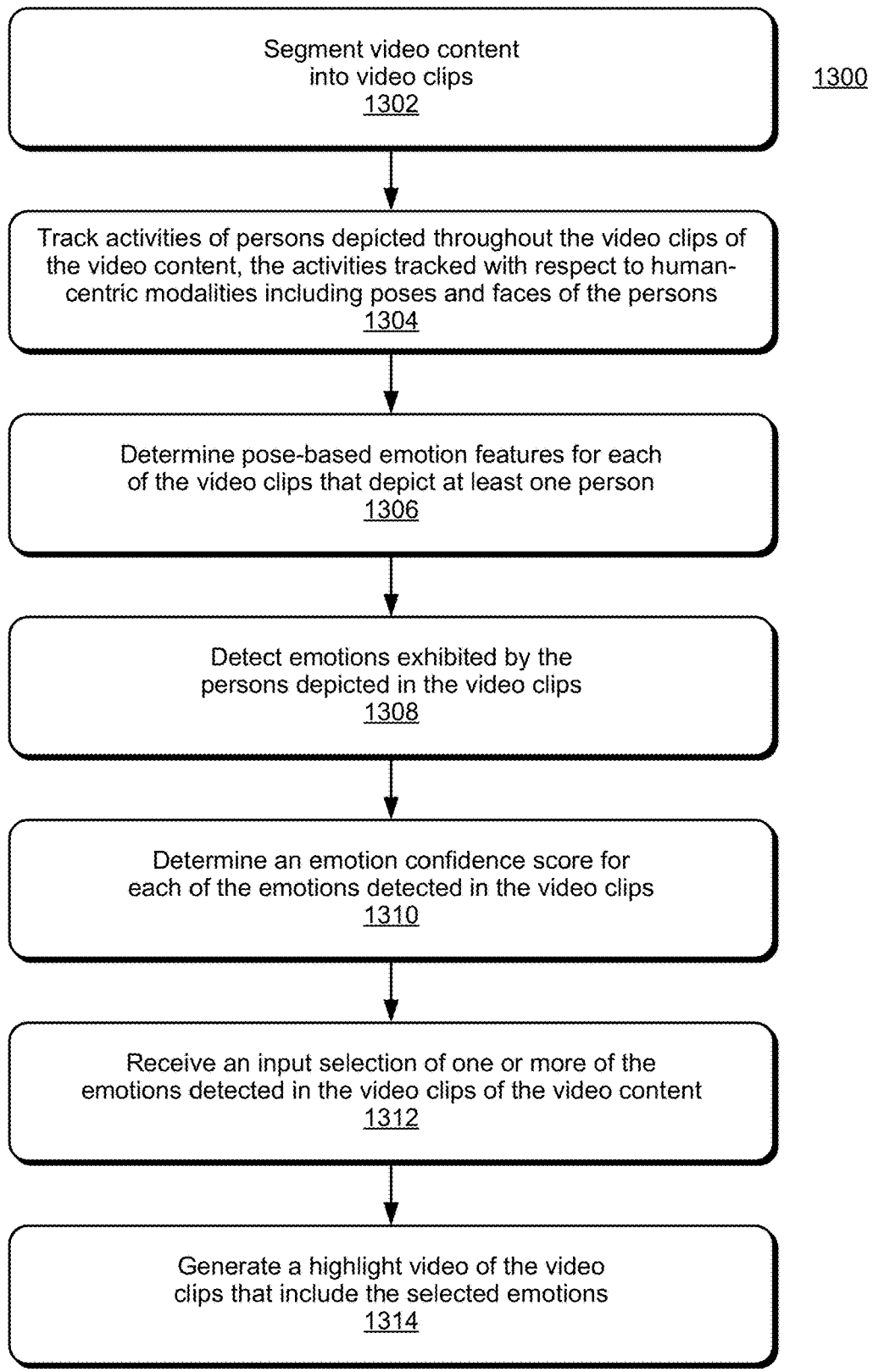

FIG. 13 illustrates example method(s) 1300 for a highlight video generated with adaptable multimodal customization, and is generally described with reference to the multimodal detection system implemented by a computing device as shown and described with reference to FIGS. 1-10. The order in which the method is described is not intended to be construed as a limitation, and any number or combination of the method operations can be combined in any order to implement a method, or an alternate method.

At 1302, video content is received and segmented into video clips. For example, the activity tracking model 104 of the multimodal detection system 100 receives the video content 102 as an input to the system, and the video segmenter 202 segments the video content into a sequence of video clips as the segmented video clips 116. The video content 102 can be segmented into the sequence of video clips 116 based on a designated duration, such as in half-second durations, one second durations, five second durations, etc. Alternatively or in addition, the duration of the video clips 116 may be based on a continuity of the action depicted in the video content 102, given that activity may be relatively slow or relatively fast depending on the intended subject tracking in the video content.

At 1304, activities of persons depicted throughout one or more of the video clips of the video content are tracked with respect to human-centric modalities including poses and faces of the persons. For example, the activity tracking model 104 of the multimodal detection system 100 implements a multi-person tracker and utilizes the pose extraction algorithm 204 to track and graph the poses 122 of each person depicted in a video clip 116 of the video content 102. Similarly, the activity tracking model 104 utilizes the face extraction algorithm 206 to track and graph the faces 124 of each person depicted in a video clip 116 of the video content.

At 1306, pose-based emotion features are determined for each of the video clips that depict at least one person. For example, the pose-based emotion recognition network 110 of the multimodal detection system 100 determines the pose-based emotion features 140 for each of the video clips that depict at least one person, where a pose-based emotion feature 128 of a video clip 116 indicates an emotion determined based on the tracked poses 122 of the one or more persons depicted in the video clip.

At 1308, emotions are detected as exhibited by the one or more persons depicted in the video clips. For example, the class detection model 108 of the multimodal detection system 100 implements the pose-based emotion recognition network 110 to detect the classes of the emotions 134 expressed or exhibited by the one or more persons depicted in the video clips 116 of the video content 102. The pose-based emotion recognition network 110 detects the emotions 134 in a video clip 116 based on the pose-based emotion features 140 corresponding to the video clip.

At 1310, an emotion confidence score is determined for each of the emotions detected in the video clips. For example, the class detection model 108 of the multimodal detection system 100 implements the pose-based emotion recognition network 110, which determines the emotion confidence score 138 for each of the emotions 134 detected in the video clips 116 of the video content, where the emotion confidence score 138 for an emotion 134 indicates a degree to which the emotion occurs in the video clips.

At 1312, an input is received as a selection of one or more of the emotions detected in the video clips of the video content. For example, the multimodal detection system 100 includes the user interface 114, which displays the more relevant (occurring most often) emotions 134 detected in the video clips 116 of the video content 102, and the user selection inputs 144 are received in the user interface as one or more of the emotions 134 expressed or exhibited by the persons depicted in the video clips. The video clips are filtered by the adaptive filtering system 112 based on the selected emotions 134 according to the ranking of the video clips. Additionally, the ranked video clips 140 are filtered by the adaptive filtering system 112 based on the emotion confidence score 138 for each of the ranked video clips.

At 1314, a highlight video is generated from the video clips that include the selected emotions. For example, the adaptive filtering system 112 of the multimodal detection system 100 generates the highlight video from the ranked and filtered video clips 142 of the video content 102 that depict the user selected emotions 134. The adaptive filtering system 112 operates in conjunction with receiving the user selection inputs 144 via the user interface 114 to select the emotions, and filters the ranked video clips 140 to generate an updated set of filtered video clips 142, from which the highlight video 146 is generated.

Figure 14:
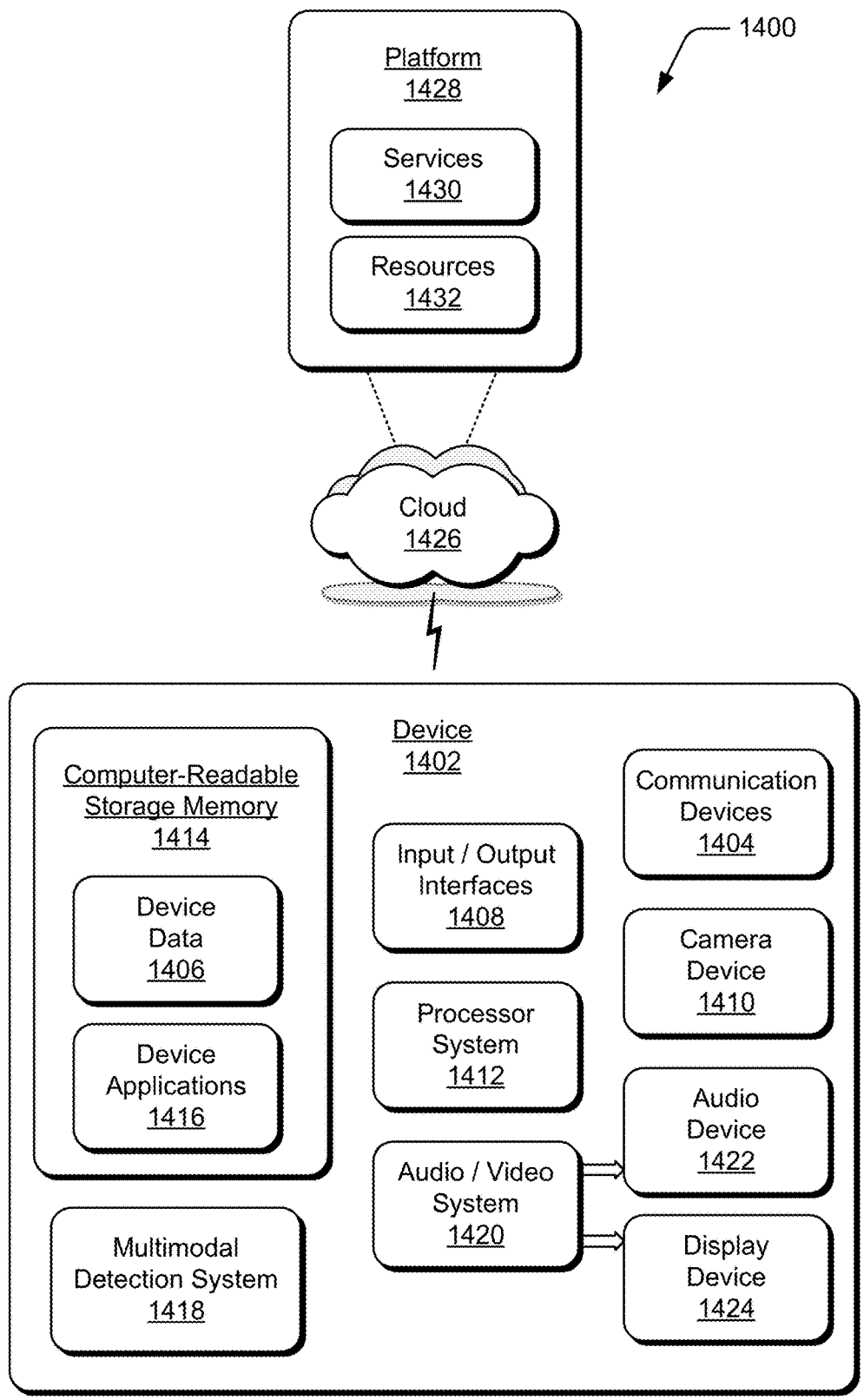
FIG. 14 illustrates an example system with an example device that can implement aspects of the techniques for a highlight video generated with adaptable multimodal customization.

FIG. 14 illustrates an example system 1400 that includes an example device 1402, which can implement techniques of a highlight video generated with adaptable multimodal customization. The example device 1402 can be implemented as any of the computing devices, mobile devices, server devices, and/or services described with reference to the previous FIGS. 1-13, such as any type of computing device, client device, mobile phone, tablet, communication, entertainment, gaming, media playback, and/or other type of device. For example, the multimodal detection system 100 can be implemented by the example device 1402.

The example device 1402 includes communication devices 1404 that enable wired and/or wireless communication of device data 1406, such as any of the video content, video clips, highlight video, and/or any other of the multimodal detection system data, as well as computer applications data and content that is transferred from one computing device to another, and/or synched between multiple computing devices. The device data 1406 can include any type of audio, video, image, and/or graphic data that is received and/or generated by applications executing on the device. The communication devices 1404 can also include transceivers for cellular phone communication and/or for network data communication.

The device 1402 also includes input/output (I/O) interfaces 1408, such as data network interfaces that provide connection and/or communication links between the device, data networks, and other devices. The I/O interfaces can be used to couple the device to any type of components, peripherals, and/or accessory devices, such as a digital camera device 1410 and/or computer input device that may be integrated with the example device 1402. The I/O interfaces also include data input ports via which any type of data, media content, and/or inputs can be received, such as user inputs to the device, as well as any type of audio, video, and/or image data received from any content and/or data source.

The device 1402 includes a processor system 1412 that may be implemented at least partially in hardware, such as with any type of microprocessors, controllers, and the like that process executable instructions. The processor system 1412 can include components of an integrated circuit, programmable logic device, a logic device formed using one or more semiconductors, and other implementations in silicon and/or hardware, such as a processor and memory system implemented as a system-on-chip (SoC). Alternatively or in addition, the device 1402 can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The example device 1402 also includes computer-readable storage memory 1414, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 1414 can include various implementations of random access memory (RAM), read-only memory (ROM), flash memory, and other types of storage memory in various memory device configurations.

The computer-readable storage memory 1414 provides storage of the device data 1406 and various device applications 1416, such as an operating system that is maintained as a software application with the computer-readable storage memory and executed by the processor system 1412. In this example, the device 1402 includes a multimodal detection system 1418 that implements the described techniques of a highlight video generated with adaptable multimodal customization. The multimodal detection system 1418 may be implemented with hardware components and/or in software as one of the device applications 1416, such as when the multimodal detection system is implemented by the example device 1402. An example of the multimodal detection system 1418 includes the multimodal detection system 100, which is implemented with various components, such as models, systems, algorithms, and/or networks configured together to generate a highlight video of the more interesting and relevant portions of a captured video. In implementations, the multimodal detection system 1418 may include independent processing, memory, and logic components as a computing and/or electronic device integrated with the device 1402.

In implementations, the multimodal detection system 1418 and/or any of the components of the multimodal detection system can be implemented as any type of machine learning or neural network with trained classifiers, such as in software and/or in hardware in any type of computing device. The machine learning can be implemented by the device 1402 as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

The device 1402 also includes an audio and/or video system 1420 that generates audio data for an audio device 1422 and/or generates display data for a display device 1424. The audio device and/or the display device include any devices that process, display, and/or otherwise render audio, video, display, and/or image data. In implementations, the audio device and/or the display device are integrated components of the example device 1402. Alternatively, the audio device and/or the display device are external, peripheral components to the example device. In embodiments, at least part of the techniques described for highlight video generated with adaptable multimodal customization may be implemented in a distributed system, such as over a "cloud" 1426 in a platform 1428. The cloud 1426 includes and/or is representative of the platform 1428 for services 1430 and/or resources 1432.

The platform 1428 abstracts underlying functionality of hardware, such as server devices (e.g., included in the services 1430) and/or software resources (e.g., included as the resources 1432), and connects the example device 1402 with other devices, servers, etc. The resources 1432 may also include applications and/or data that can be utilized while computer processing is executed on servers that are remote from the example device 1402. Additionally, the services 1430 and/or the resources 1432 may facilitate subscriber network services, such as over the Internet, a cellular network, or Wi-Fi network. The platform 1428 may also serve to abstract and scale resources to service a demand for the resources 1432 that are implemented via the platform, such as in an interconnected device embodiment with functionality distributed throughout the system 1400. For example, the functionality may be implemented in part at the example device 1402 as well as via the platform 1428 that abstracts the functionality of the cloud 1426.

Although implementations of a highlight video generated with adaptable multimodal customization have been described in language specific to features and/or methods, the appended claims are not necessarily limited to the specific features or methods described. Rather, the specific features and methods are disclosed as example implementations of a highlight video generated with adaptable multimodal customization, and other equivalent features and methods are intended to be within the scope of the appended claims. Further, various different examples are described and it is to be appreciated that each described example can be implemented independently or in connection with one or more other described examples.

The invention claimed is:

1. A method implemented by a multimodal detection system for a highlight video generated with adaptable multimodal customization, the method comprising:
    segmenting video content into video clips;
    tracking activities of one or more persons depicted throughout one or more of the video clips of the video content, the activities being tracked with respect to human-centric modalities including poses and faces of the one or more persons;
    determining a pose highlight score for each of the video clips that depict at least one person, the pose highlight score representing a relative level of interest in an activity based on the poses of the one or more persons depicted in a video clip;
    determining a face highlight score for each of the video clips that depict at least one person, the face highlight score representing the relative level of the interest in the activity based on the faces of the one or more persons depicted in the video clip;
    ranking the video clips of the video content based on the relative levels of interest in the activities of the one or more persons depicted in respective video clips based on the face highlight scores and the pose highlight scores of each of the video clips;
    determining pose-based emotion features for each of the video clips that depict at least one person, a pose-based emotion feature indicating an emotion determined based on the poses of the one or more persons depicted in the video clip;
    detecting actions depicted in the video clips based on the activities of the one or more persons depicted in a respective video clip; and
    detecting emotions exhibited by the one or more persons depicted in the video clips, the emotions detected in the video clip based on the pose-based emotion features corresponding to the video clip.

2. The method of claim 1, further comprising:
    filtering the video clips according to a ranking of the video clips for higher levels of activity to lower levels of activity depicted in the respective video clips; and
    generating the highlight video of the ranked and filtered video clips.

3. The method of claim 1, wherein:
    the face highlight scores and the pose highlight scores of the video clips ranging from zero to one;
    a face highlight score of one indicates a higher level of the interest in an activity depicted in the video clip than a face highlight score of zero; and
    a pose highlight score of one indicates a higher level of the interest in the activity depicted in the video clip than a pose highlight score of zero.

4. The method of claim 1, further comprising:
    determining an action confidence score for each of the actions detected in the video clips, the action confidence score for an action indicating a degree to which the action occurs in the video clips of the video content;
    receiving an input selection of one or more of the actions detected in the video clips of the video content;
    filtering the ranked video clips based on the selected one or more actions and the action confidence score for each of the ranked video clips; and
    generating the highlight video of the ranked and filtered video clips that depict the selected one or more actions detected in the ranked and filtered video clips.

5. The method as recited in of claim 1, further comprising:
    determining an emotion confidence score for each of the emotions detected in the video clips, the emotion confidence score for the emotion indicating a degree to which the emotion occurs in the video clips of the video content;
    receiving an input selection of one or more of the emotions exhibited by the one or more persons depicted in the video clips of the video content;
    filtering the ranked video clips based on the selected one or more emotions and the emotion confidence score for each of the ranked video clips; and
    generating the highlight video of the ranked and filtered video clips that depict the selected one or more emotions detected in the ranked and filtered video clips.

6. The method of claim 1, further comprising:
    receiving an input selection of one or more of the actions detected in the video clips of the video content;
    filtering the ranked video clips based on the selected one or more actions according to the ranking of the video clips; and
    generating the highlight video of the filtered video clips that depict the selected one or more actions and according to the ranking of the video clips having a higher level of the interest in the activities.

7. The method of claim 1, further comprising:
    receiving a first input selection of one or more of the actions detected in the video clips of the video content;
    filtering the ranked video clips based on the selected one or more actions according to the ranking of the video clips;
    receiving a second input selection of one or more of the emotions exhibited by the one or more persons depicted in the video clips of the video content;
    filtering the ranked video clips based on the selected one or more emotions; and generating the highlight video of the ranked and filtered video clips that depict the selected one or more actions and include the one or more selected emotions.

8. The method of claim 1, wherein the pose-based emotion features are determined by a network of the multimodal detection system, with graph convolution network layers of the network trained unsupervised without human annotations to facilitate the determinations of the pose-based emotion features.

9. A multimodal detection system implemented for a highlight video generated with adaptable multimodal customization, the multimodal detection system comprising:
   a video segmenter configured to receive and segment video content into video clips;
   an activity tracking model configured to track activities of one or more persons depicted throughout one or more of the video clips of the video content, the activities being tracked with respect to human-centric modalities including poses and faces of the one or more persons;
   an autoencoder system configured to determine a pose highlight score and a face highlight score for each of the video clips that depict at least one person, the pose highlight score representing a relative level of interest in an activity based on the poses of the one or more persons depicted in a video clip, the face highlight score representing a relative level of the interest in the activity based on the faces of the one or more persons depicted in the video clip;
   a class detection model configured to detect actions depicted in the video clips based on the activities of the one or more persons depicted in a respective video clip; and
   an adaptive filtering system configured to receive an input selection of one or more of the actions detected in the video clips and filter the video clips based on the selected one or more actions according to a ranking of the activities depicted in the respective video clips.

10. The multimodal detection system of claim 9, wherein the adaptive filtering system is configured to rank the video clips of the video content for higher levels of activity to lower levels of activity depicted in the respective video clips based on the face highlight scores and the pose highlight scores of each of the video clips.

11. The multimodal detection system of claim 10, wherein the adaptive filtering system is configured to generate the highlight video of the ranked and filtered video clips.

12. The multimodal detection system of claim 9, wherein the class detection model is configured to determine an action confidence score for each of the actions detected in the video clips, the action confidence score for an action indicating a degree to which the action occurs in the video clips of the video content.

13. The multimodal detection system of claim 12, wherein the adaptive filtering system is configured to:
   filter the video clips based on the action confidence score for each of the video clips and based on the selected one or more actions according to the video clips ranked for higher levels of activity to lower levels of activity depicted in the respective video clips; and
   generate the highlight video of the ranked and filtered video clips that depict the selected one or more actions detected in the ranked and filtered video clips.

14. The multimodal detection system of claim 9, further comprising a pose-based emotion recognition network configured to determine pose-based emotion features for each of the video clips that depict at least one person, a pose-based emotion feature indicating an emotion determined based on the poses of the one or more persons depicted in a video clip.

15. The multimodal detection system of claim 14, wherein:
   the class detection model is configured to detect emotions exhibited by the one or more persons depicted in the video clips, the emotions detected in the video clip based on the pose-based emotion features corresponding to the video clip; and
   the adaptive filtering system is configured to:
   filter the video clips based on the selected one or more actions according to the ranking of the video clips for higher levels of activity to lower levels of activity depicted in the respective video clips;
   receive an additional input selection of one or more of the emotions detected in the video clips;
   filter the ranked video clips based on the selected one or more emotions; and
   generate the highlight video of the ranked and filtered video clips that depict the selected one or more actions and include the selected one or more emotions.

16. A method implemented by a multimodal detection system for a highlight video generated with adaptable multimodal customization, the method comprising:
   segmenting video content into video clips;
   tracking activities of one or more persons depicted throughout one or more of the video clips of the video content, the activities being tracked with respect to human-centric modalities including poses and faces of the one or more persons;
   determining pose-based emotion features for each of the video clips that depict at least one person, a pose-based emotion feature indicating an emotion determined based on the poses of the one or more persons depicted in a video clip;
   detecting emotions exhibited by the one or more persons depicted in the video clips, the emotions detected in the video clip based on the pose-based emotion features corresponding to the video clip;
   filtering the video clips according to a ranking of the video clips for higher levels of activity to lower levels of activity depicted in respective video clips;
   receiving an input selection of one or more of the emotions detected in the video clips of the video content; and
   generating the highlight video of the video clips from the ranked and filtered video clips that include the selected one or more emotions exhibited by the one or more persons depicted in the video clips of the video content.

17. The method as recited in of claim 16, further comprising:
   detecting actions depicted in the video clips based on the activities of the one or more persons depicted in a respective video clip;
   receiving an additional input selection of one or more of the actions detected in the video clips of the video content;
   filtering the video clips based on the selected one or more actions according to the ranking of the video clips; and
   wherein the highlight video is generated from the ranked and filtered video clips that depict the selected one or more actions and include the selected one or more emotions.

18. The method of claim 16, further comprising:
   determining an emotion confidence score for each of the emotions detected in the video clips, the emotion confidence score for an emotion indicating a degree to which the emotion occurs in the video clips of the video content;

ranking the video clips based on the emotion confidence score for each of the video clips; and wherein the highlight video is generated from the ranked video clips that include the selected one or more emotions.

19. The method of claim 16, further comprising:

determining a pose highlight score for each of the video clips that depict the at least one person, the pose highlight score representing a level of interest in the activity based on the poses of the one or more persons depicted in a video clip; and determining a face highlight score for each of the video clips that depict the at least one person, the face highlight score representing a level of the interest in the activity based on the faces of the one or more persons depicted in the video clip.

20. The method of claim 16, further comprising:

filtering the video clips according to the ranking of the video clips for higher levels of activity to lower levels of activity depicted in the respective video clips.

\* \* \* \* \*

UNITED STATES PATENT AND TRADEMARK OFFICE
CERTIFICATE OF CORRECTION

| | | |
|---|---|---|
| PATENT NO. | : 11,574,477 B2 | |
| APPLICATION NO. | : 17/194755 | |
| DATED | : February 7, 2023 | |
| INVENTOR(S) | : Gang Wu et al. | |

It is certified that error appears in the above-identified patent and that said Letters Patent is hereby corrected as shown below:

In the Claims

Column 28, Line 32, after "The method", delete "as recited in".

Column 29, Line 8, after "to facilitate", delete "the".

Column 30, Line 51, after "The method", delete "as recited in".

Signed and Sealed this
Fourth Day of April, 2023

Katherine Kelly Vidal
*Director of the United States Patent and Trademark Office*